(12) United States Patent
Deshmukh et al.

(10) Patent No.: US 12,299,283 B2
(45) Date of Patent: May 13, 2025

(54) SELF-CHARACTERIZING, EVALUATING, AND ADAPTIVE HIGH PERFORMANCE MEMORY CONTROLLER

(71) Applicant: QUALCOMM Incorporated, San Diego, CA (US)

(72) Inventors: Pankaj Deshmukh, San Diego, CA (US); Subbarao Palacharla, San Diego, CA (US); Shyamkumar Thoziyoor, San Diego, CA (US); Jungwon Suh, San Diego, CA (US); Anurag Nannaka, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 64 days.

(21) Appl. No.: 18/354,525

(22) Filed: Jul. 18, 2023

(65) Prior Publication Data
US 2025/0028445 A1    Jan. 23, 2025

(51) Int. Cl.
*G06F 3/00* (2006.01)
*G06F 3/06* (2006.01)
*G06F 12/00* (2006.01)

(52) U.S. Cl.
CPC ............ *G06F 3/061* (2013.01); *G06F 3/0634* (2013.01); *G06F 3/0653* (2013.01); *G06F 3/0658* (2013.01); *G06F 3/0659* (2013.01); *G06F 3/0673* (2013.01)

(58) Field of Classification Search
CPC ...... G06F 3/061; G06F 3/0634; G06F 3/0653; G06F 3/0658; G06F 3/0659; G06F 3/0673

USPC .......................................................... 711/105
See application file for complete search history.

(56) References Cited

U.S. PATENT DOCUMENTS

| | | | |
|---|---|---|---|
| 11,429,300 B2* | 8/2022 | Pekney | G06F 3/0604 |
| 11,868,655 B2* | 1/2024 | Sankaranarayanan | G06F 3/0659 |
| 2005/0060533 A1* | 3/2005 | Woo | G06F 12/0215 711/E12.004 |
| 2018/0233206 A1* | 8/2018 | Yu | G11C 16/10 |
| 2019/0278705 A1* | 9/2019 | Park | G06F 13/1689 |
| 2020/0065028 A1* | 2/2020 | Keil | G06F 3/0659 |
| 2023/0041215 A1* | 2/2023 | Porzio | G06F 3/0625 |
| 2023/0054363 A1* | 2/2023 | Li | G06F 3/0611 |
| 2023/0066951 A1* | 3/2023 | Sankaranarayanan | G06F 12/0868 |
| 2023/0068605 A1* | 3/2023 | Sankaranarayanan | G06F 3/061 |
| 2024/0069804 A1* | 2/2024 | Brewer | G06F 3/0622 |

* cited by examiner

*Primary Examiner* — Sheng Jen Tsai
(74) *Attorney, Agent, or Firm* — Muncy, Geissler, Olds & Lowe, P.C./QUALCOMM

(57) ABSTRACT

Various embodiments include systems and methods for improving the efficiency of a memory subsystem in a computing device. The memory subsystem may be configured to detect memory access events and determining their associated timings and determine an efficiency of the memory subsystem based on operational parameters of the memory subsystem, the detecting memory access events, and associated timings. The memory subsystem may adjust the operational parameters of the memory subsystem based on the determined efficiency of the memory subsystem. The memory subsystem may dynamically modify the operations of the memory subsystem based on the adjusted operational parameters.

30 Claims, 13 Drawing Sheets

SELF-CHARACTERIZING, EVALUATING, AND ADAPTIVE HIGH PERFORMANCE MEMORY CONTROLLER

BACKGROUND

Memory controllers play an important role in modern computing systems, serving as the link between the central processing unit (CPU) and dynamic random access memory (DRAM). They regulate data and command flow between the CPU and DRAM, thereby significantly influencing system performance. The efficiency of these memory controllers may have a significant impact on overall system performance. This efficiency may be driven by complex algorithms that determine data transfer timings. These algorithms may have a direct impact on the speed of command execution, the handling of priority commands, and the power usage within the memory subsystem.

Traditional memory controllers often use fixed algorithms or settings that may not adapt sufficiently to shifting computational conditions. These conventional fixed algorithm memory controllers may set static or unchanging operational parameters such as the quantity of low and high priority commands, power down initiation timings, among other memory management elements. Given the variety of applications and workloads that modern computers manage, a static memory controller may not provide adequate performance or energy efficiency. For example, a memory controller configured for power efficiency may not provide the best performance for data-intensive tasks and vice versa.

SUMMARY

Various aspects include methods for improving the efficiency of a memory subsystem in a computing device. Various aspects may include monitoring memory access events; determining adjustments to operational parameters of the memory subsystem to improve efficiency based on operational parameters of the memory subsystem, memory access events, and associated timings; and adjusting the operational parameters of the memory subsystem based on the determined adjustments. In some aspects, determining adjustments to operational parameters of the memory subsystem to improve efficiency may include: determining timings associated with memory access events based on start and end times of detected memory access events; determining an efficiency of the memory subsystem based on operational parameters of the memory subsystem, memory access events, and associated timings; and determining adjustments to the operational parameters of the memory subsystem based on the determined efficiency, the method further including dynamically modifying operations of the memory subsystem based on the adjusted operational parameters.

Some aspects may include monitoring the memory subsystem to detect memory access events, determining timings associated with detected memory access events based on start and end times of detected memory access events, determining an efficiency of the memory subsystem based on operational parameters of the memory subsystem, the detecting memory access events, and associated timings, determining adjustments to the operational parameters based on the determined efficiency, adjusting the operational parameters of the memory subsystem based on the determined adjustments, and dynamically modifying operations of the memory subsystem based on the adjusted operational parameters.

In some aspects, monitoring the memory subsystem to detect the memory access events may include monitoring the memory subsystem to detect at least one of an activate command, a pre-charge command, a column command, a self-refresh command, a power down command, a signal from a read queue, or a signal from a write queue.

In some aspects, determining the efficiency of the memory subsystem based on the operational parameters of the memory subsystem, the detecting memory access events, and the associated timings may include least one of: determining an idle time key performance indication (KPI) by measuring periods that the memory subsystem is not actively processing data, determining a data packet time KPI by adding up durations during which the memory subsystem is actively processing data transactions; or determining an overhead KPI by tracking the time spent on non-data related operations. In some aspects, determining the efficiency of the memory subsystem based on the operational parameters of the memory subsystem, the detecting memory access events, and the associated timings further may include generating an efficiently ratio value by comparing the data packet time KPI to the sum of the idle time KPI and the overhead KPI, and determining the efficiency of the memory subsystem based on the efficiently ratio value.

In some aspects, determining adjustments to the operational parameters based on the determined efficiency may include determining the adjustments to the operational parameters based on at least one of a heuristic or a machine learning model. In some aspects, adjusting the operational parameters of the memory subsystem based on the determined adjustments may include modifying a scheduling algorithm that determines memory command priorities to adjust a ratio of low-priority (LP) to high-priority (HP) commands operational parameter. In some aspects, dynamically modifying the operations of the memory subsystem based on the adjusted operational parameters may include modifying a scheduling algorithm based on an adjusted ratio of low-priority (LP) to high-priority (HP) commands operation parameter and an adjusted hysteresis timer threshold value.

Further aspects may include a computing device having a processor configured with processor-executable instructions to perform various operations corresponding to the methods summarized above. Further aspects may include a non-transitory processor-readable storage medium having stored thereon processor-executable instructions configured to cause a processor to perform various operations corresponding to the method operations summarized above. Further aspects may include a computing device having various means for performing functions corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIG. 5 is a component block diagram illustrating a computing subsystem that includes a Proportional-Integral-Derivative (PID) controller in accordance with some embodiments.

DETAILED DESCRIPTION

Figure 1:
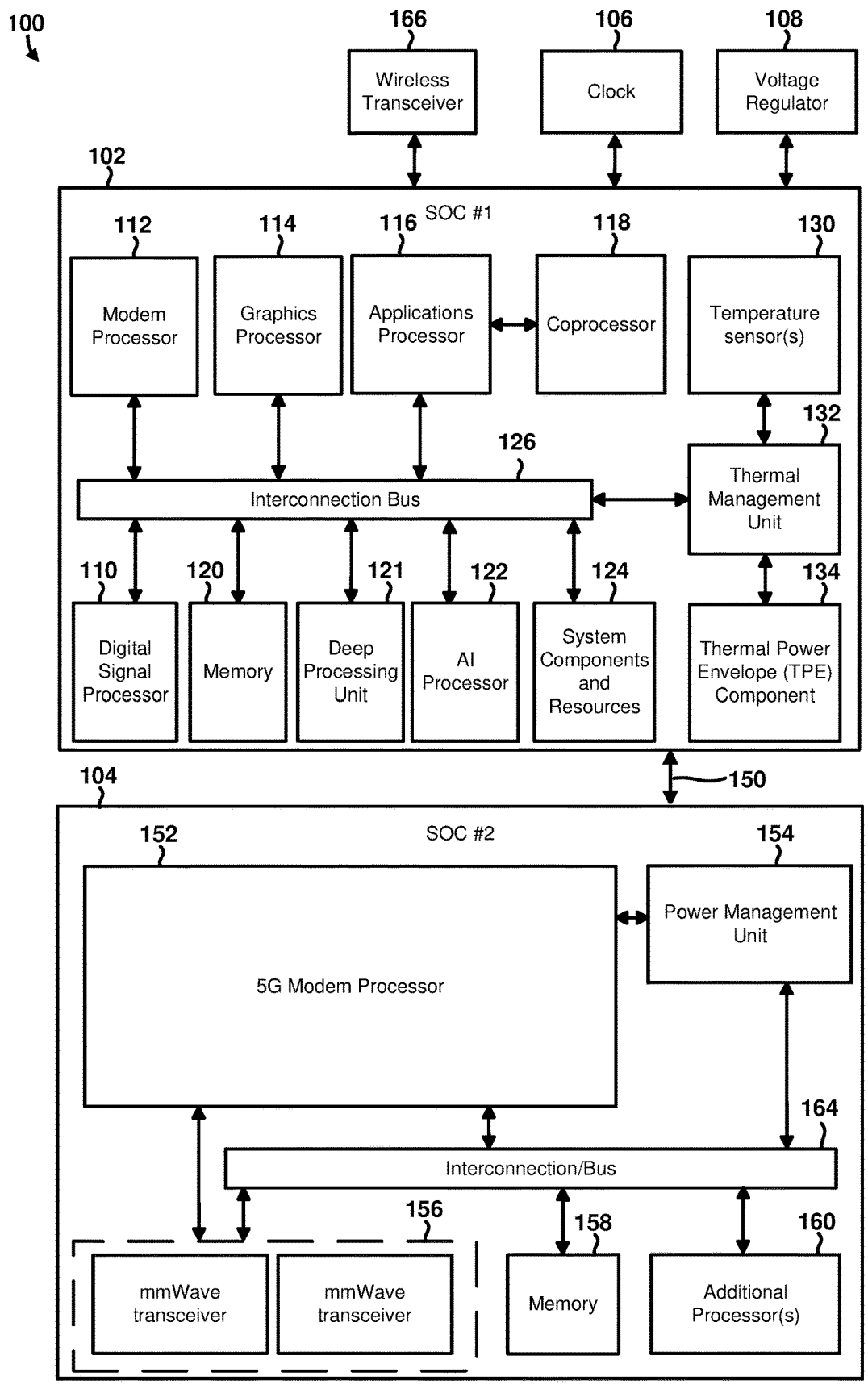
FIGS. 1-3 are component block diagrams illustrating example computing systems that may be configured to implement some embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

The various embodiments include an adaptable memory controller that implements a dynamic approach to self-monitoring and adaptive tuning to repeatedly adjust performance parameters (e.g., parameters affecting the Key Performance Indicators (KPIs) of a particular subsystem of the device) based on real-time feedback.

In overview, various embodiments include methods, and computing devices configured to implement the methods, for improving the efficiency of a memory subsystem in a computing device. The memory subsystem may be configured to monitor a memory (DRAM) to detect memory access events, determine timings associated with the detected memory access events based on the start and end times of the detected memory access events, and determine the efficiency of the memory subsystem based on operational parameters of the memory subsystem, the detecting memory access events, and associated timings. The memory subsystem may determine adjustments to the operational parameters based on the determined efficiency, adjust the operational parameters of the memory subsystem based on the determined adjustments, and dynamically modify the operations of the memory subsystem based on the adjusted operational parameters. The memory subsystem may perform these operations continuously or repeatedly until the operational parameters improve, maintain, or balance tradeoffs between the performance, responsiveness, and power consumption characteristics of the computing device.

By providing dynamic, responsive control over these various parameters, various embodiments provide a memory controller solution that may self-adapt to different conditions and demands, thereby improving performance, efficiency, and power usage in the computing device. By continuously or repeatedly self-monitoring and making real-time adjustments, the adaptable memory controller may improve the performance and efficiency of the memory resources in the computing device. For these and other reasons, the embodiments may improve the performance and/or functioning of a computing device. Other improvements to the performance and/or functioning of a computing device will be evident from the disclosures below.

The term "computing device" may be used herein to refer to any one or all of quantum computing devices, edge devices, Internet access gateways, modems, routers, network switches, residential gateways, access points, integrated access devices (IAD), mobile convergence products, networking adapters, multiplexers, personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., smartwatch, head-mounted display, fitness tracker, etc.), media players (e.g., DVD players, ROKU™, AppleTV™, etc.), digital video recorders (DVRs), automotive displays, portable projectors, 3D holographic displays, and other similar devices that include a display and a programmable processor that can be configured to provide the functionality of various embodiments.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC also may include any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. SoCs also may include software for controlling integrated resources and processors, as well as for controlling peripheral devices.

The term "system in a package" (SIP) may be used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

In modern computing devices, memory subsystems typically include components such as a cache controller, low power island, microcontroller, double data rate physical interface (DDRPHY), and memory controller. Despite the dynamic nature of these devices, their memory subsystems often operate according to static controls, predefined settings, or preset parameters. Such static operations could lead to inefficiencies, particularly when faced with varying demand scenarios, such as requests for changes in operational frequency, latency, or bandwidth.

For example, the processors or cores in a computing device may regularly request alterations in operational frequency, latency, or bandwidth from the subsystems. Yet, conventional memory subsystems inadequately accommodate settings adjustments based on these demands or other factors such as incoming traffic patterns or client access trends. This could result in degraded performance, inefficient scheduling, suboptimal bandwidth utilization, increased latency, or other factors or conditions that have a negative impact on the performance or functioning of the computing device.

Thus, static controls or settings within the memory subsystems may cause a variety of inefficiencies and potentially diminish the computing device's performance or energy consumption characteristics. Various embodiments overcome the limitations of conventional solutions by providing a more dynamic, adaptable approach to memory subsystem management.

For ease of references, some embodiments are discussed herein with reference to a memory controller and dynamic random access memory (DRAM). However, it should be understood that the various embodiments may be applicable to a variety of different memory subsystems and/or several types of memories. As such, nothing in this application should be used to limit the claims to a memory controller or DRAM unless expressly recited as such in the claims.

Recent advancements in computing devices (e.g., mobile devices, automotive systems, artificial intelligence (AI) platforms, etc.) have been accompanied by an increased demand for efficient and effective memory management. These devices process an ever growing volume of data, and the task of managing and controlling access to memory is becoming increasingly important. Memory controllers play a significant role in this process, interfacing with the processor and DRAM to perform data transfers, coordinating access to memory locations, and managing memory operations or other tasks, such as refreshing DRAM cells and managing power usage.

A memory controller may also manage, control or coordinate the timing requirements of the memory subsystems and/or perform command scheduling operations that include issuing commands (e.g., read, write, etc.) to the DRAM. Command scheduling may be a complex or processor or power intensive task that uses sophisticated algorithms and/or heuristics to make decisions in real-time. For example, the memory controller may use a variety of factors or criteria to determine the best way to schedule commands to memory. Such factors/criteria may include the request type, access pattern, row buffer management, DRAM timing constraints, bank parallelism, and priority requests. Due to the complexity and dynamic characteristics of these and other factors and components in the computing device, operating the memory subsystems based on static settings or controls could have a significant negative impact on the overall performance, latency, functioning, and/or power consumption characteristics of the computing device.

Some embodiments may include an adaptable memory controller configured to overcome the above described limitations of conventional solution. The adaptable memory controller may be configured to dynamically or adaptively adjust command scheduling based on real-time metrics (e.g., efficiency and latency metrics, etc.). By dynamically adjusting command scheduling, the adaptable memory controller may increase overall efficiency, reduce latency, and/or overcome various other limitations of conventional solutions.

In some embodiments, the adaptable memory controller may be configured to improve both the performance and power consumption characteristics of the computing device. In some embodiments, the adaptable memory controller may be configured to perform self-monitoring, evaluate key performance indicators (KPIs), and dynamically adjust its parameters to enhance or improve the KPIs. This adaptability may allow the memory controller to respond more effectively to variations in data traffic, access patterns, and client demands. This may in turn improve system performance, bandwidth utilization, and latency while maintaining or improving the power efficiency or power consumption characteristics of the device.

A memory controller in a computing system often handles frequent minor read and write requests interspersed with idle intervals. Traditionally, the memory controller identifies these idle periods, when command processing is not required, and switches to a low-power mode to conserve energy. However, every minor request may require that the system exit this low-power state, process the command, and then re-enter the low-power mode once the request is complete and another idle period ensues. This constant shifting between states (e.g., dithering) comes with its own energy and time costs. Instead of conserving energy as intended, the overhead associated with each transition could lead to greater power consumption than if the system simply remained in the active, normal, or full power mode. On the other hand, if the system remains in active mode during a prolonged idle period, it could significantly and negatively affect the device's power consumption characteristics. As such, finding a balance between power modes (or other setting adjustments) is important for improving the performance and power efficiency of the computing device.

In some embodiments, the adaptable memory controller may include a hysteresis timer and/or other components configured to reduce or eliminate excessive dithering or transitions and/or to balance tradeoffs between performance, responsiveness, and power consumption of the device. Generally, hysteresis is a phenomenon in which the state of a system is dependent on both its history and its current environment. It is often observed in systems that transition between different states and the transition is not only dependent on the current inputs to the system but also on how the system has been manipulated in the past.

In some embodiments, the adaptable memory controller may be configured to use the hysteresis timer to intelligently manage various transitions in various subsystems in the computing system, such as transitions in the power state of the DRAM. For example, the hysteresis timer may be used to control when the system enters a low-power mode or power-down mode. The memory controller may start the hysteresis timer in response to determining that there is no read or write commands being processed, determine whether the hysteresis timer exceeds a threshold value, and enter the low-power or power-down mode in response to determining that the hysteresis timer exceeds the threshold value. As such, the hysteresis timer may effectively add a delay before the system enters the low-power mode, thereby preventing the system from constantly switching in and out of the low-power mode due to minor activity. In some embodiments, the memory controller may be configured to use historical information, heuristics, machine learning and/or artificial intelligence dynamically to dynamically adjust the value of the hysteresis timer to improve, maintain, or balance tradeoffs between the performance, responsiveness, and power consumption characteristics of the computing device.

In some embodiments, the adaptable memory controller may be configured to evaluate and adjust memory parameters, settings, and/or configurations in real-time repeatedly/continuously in order to maintain or improve the performance, efficiency, and/or power consumption characteristics of the memory system and/or computing device. For example, the adaptable memory controller may balance tradeoffs between different Key Performance Indicators (KPIs) such as DRAM bandwidth, power efficiency, and DDR utilization. By continuously monitoring performance parameters, making informed decisions, and adjusting configurations accordingly, the adaptable memory controller system may improve efficiency and/or latency of the memory system, which may in turn improve the performance, responsiveness, and/or power consumption characteristics of the computing device.

Some embodiments may include methods for managing or operating the high-performance memory controller. In some embodiments, the methods may include monitoring, detecting and/or measuring (e.g., by a performance monitor component, etc.) events and durations associated with memory access in the computing device, determining (e.g., by a self-monitor evaluator component, etc.) the efficiency and/or performance patterns of the memory controller based on the events and durations associated with memory access, adjusting (e.g., by a weight adder-subtractor component, etc.) various operational parameters of the memory controller based on the determined efficiency and/or performance patterns of the memory controller, and modifying (e.g., by a settings modulator component, etc.) the operational parameters of the computing device in response to the adjustments. In some embodiments, the operational parameters may include the ratio of low-priority (LP) to high-priority (HP) commands sent to the DRAM and/or the characteristic of hysteresis timer.

In some embodiments, the methods may include repeatedly adjusting the hysteresis timer to balance tradeoffs between performance and power consumption.

In some embodiments, the methods may further include determining by a dithering counter whether there is excessive dithering in the operational parameters (e.g., whether a corresponding dithering value exceeds a threshold value, etc.) and halting further adjustments in response to determining that there is excessive dithering.

In some embodiments, the methods may include using configuration registers (CSRs) and managing settings to control various components or blocks of the memory controller. Examples of such settings may include Command Queue Thresholds, DRAM Page Open Time, Read-Write Switching, Power Down Entries, Ratio of Low-Priority (LP) to High-Priority (HP) Commands, Dithering Counter Mechanism, Error Correction Settings, and Timing Parameters.

A memory controller typically has multiple operational units, such as command queues, data buffers, timing units, error correction units, and power management units. Each of these units may have specific operational parameters that may be adjusted to fine-tune the performance of the memory controller. configuration registers (CSRs) are special-purpose registers within the memory controller that may be used to control various functions and operations of the memory subsystems. For example, CSRs may be used to adjust operational settings such as the timing of commands, the order in which commands are processed, power management parameters, error correction settings, etc. In some embodiments, the adaptive memory controller may dynamically adjust these and other operational settings in response to performance metrics or system workload changes measured by the memory system (e.g., in real-time, etc.).

When a command is sent to a Dynamic Random Access Memory (DRAM), the command typically targets a specific row in a specific "page" (a group of storage cells). When a page is opened (activated), it may be quicker to access other data from the same page. Thus, keeping a page open may reduce latency when subsequent commands target the same row. As such, in some embodiments the method may include setting a specific period during which a page is kept open, even if there are no immediate commands to access data from the same row. If a new command targeting the same row arrives during this period, the memory controller benefits from the reduced latency because the page is still open. But if no such command arrives, keeping the page open unnecessarily may waste power because an open page consumes more power than a closed (precharged) page. As such, in some embodiments, the memory controller may be configured to dynamically adjust this "page open" period based on real-time usage patterns. In some embodiments, the memory controller may determine the length of keeping a DRAM page open when there are no new commands targeting the same row, determine the number of read commands to send to the DRAM before switching to a write command, determine the number of low-priority commands before switching to high-priority commands, and adjust the hysteresis timer to initiate a power down request to the DRAM when there are no commands in the queues.

In some embodiments, methods may include observing various activities (e.g., activates, pre-charges, column commands, power down commands, cues from read and write queues, etc.), determining timings between actions to determine whether any decisions were incorrect, and adjusting settings based on the self-monitor evaluator's feedback by using the weight adder-subtractor, and sending the adjusted signal to the settings modulator.

In some embodiments, methods may include using a series of clocks in the performance monitor to track time durations associated with specific events, adjusting the balance of LP and HP commands based on efficiency and latency (e.g., determined based on parameters such as Idle Time, Data Packet Time, and Overhead), and adjusting the ratio of LP to HP commands based on the performance conditions observed by the self-monitor evaluator using the settings modulator. In some embodiments, the memory controller may reduce the number of LP commands and prioritize HP commands in response to determining that the HP command timeouts exceed a threshold value.

In some embodiments, methods may include adjusting the hysteresis timer based on the frequency of new commands after power down and adding a dithering counter to halt the adjustments for a period of time in response to determining that there is excessive dithering (e.g., the dithering value exceeds a threshold value, etc.).

Various embodiments may be implemented on a number of single-processor and multiprocessor computer systems, including a system-on-chip (SOC) or system in a package (SIP). FIG. 1 illustrates an example computing system or SIP 100 architecture that may be used in mobile computing devices implementing various embodiments.

With reference to FIG. 1, the illustrated example SIP 100 includes two SOCs 102, 104, a clock 106, a voltage regulator 108, and a wireless transceiver 166. The first and second SOC 102, 104 may communicate via interconnection bus 150. The various processors 110, 112, 114, 116, 118, 121, 122, may be interconnected to each other and to one or more memory elements 120, system components and resources 124, and a thermal management unit 132 via an interconnection bus 126, which may include advanced interconnects such as high-performance networks-on-chip (NOCs). Similarly, the processor 152 may be interconnected to the power management unit 154, the mm Wave transceivers 156, memory 158, and various additional processors 160 via the interconnection bus 164. These interconnection buses 126, 150, 164 may include an array of reconfigurable logic gates and/or implement a bus architecture (e.g., Core- Connect, AMBA, etc.). Communications may be provided by advanced interconnects, such as NOCs.

In some embodiments, the first SOC 102 may operate as the central processing unit (CPU) of the mobile computing device that carries out the instructions of software application programs by performing the arithmetic, logical, control and input/output (I/O) operations specified by the instructions. In some embodiments, the second SOC 104 may operate as a specialized processing unit. For example, the second SOC 104 may operate as a specialized 5G processing unit responsible for managing high volume, high speed (e.g., 5 Gbps, etc.), and/or very high-frequency short wavelength (e.g., 28 GHz mmWave spectrum, etc.) communications.

The first SOC 102 may include a digital signal processor (DSP) 110, a modem processor 112, a graphics processor 114, an application processor 116, one or more coprocessors 118 (e.g., vector co-processor) connected to one or more of the processors, memory 120, deep processing unit (DPU) 121, artificial intelligence processor 122, system components and resources 124, an interconnection bus 126, one or more temperature sensors 130, a thermal management unit 132, and a thermal power envelope (TPE) component 134. The second SOC 104 may include a 5G modem processor 152, a power management unit 154, an interconnection bus 164, a plurality of mmWave transceivers 156, memory 158, and various additional processors 160, such as an applications processor, packet processor, etc.

Each processor 110, 112, 114, 116, 118, 121, 122, 121, 122, 152, 160 may include one or more cores, and each processor/core may perform operations independent of the other processors/cores. For example, the first SOC 102 may include a processor that executes a first type of operating system (e.g., FreeBSD, LINUX, OS X, etc.) and a processor that executes a second type of operating system (e.g., MICROSOFT WINDOWS 11). In addition, any or all of the processors 110, 112, 114, 116, 118, 121, 122, 121, 122, 152, 160 may be included as part of a processor cluster architecture (e.g., a synchronous processor cluster architecture, an asynchronous or heterogeneous processor cluster architecture, etc.).

Any or all of the processors 110, 112, 114, 116, 118, 121, 122, 121, 122, 152, 160 may operate as the CPU of the mobile computing device. In addition, any or all of the processors 110, 112, 114, 116, 118, 121, 122, 121, 122, 152, 160 may be included as one or more nodes in one or more CPU clusters. A CPU cluster may be a group of interconnected nodes (e.g., processing cores, processors, SOCs, SIPs, computing devices, etc.) configured to work in a coordinated manner to perform a computing task. Each node may run its own operating system and contain its own CPU, memory, and storage. A task that is assigned to the CPU cluster may be divided into smaller tasks that are distributed across the individual nodes for processing. The nodes may work together to complete the task, with each node handling a portion of the computation. The results of each node's computation may be combined to produce a final result. CPU clusters are especially useful for tasks that can be parallelized and executed simultaneously. This allows CPU clusters to complete tasks much faster than a single, high-performance computer. Additionally, because CPU clusters are made up of multiple nodes, they are often more reliable and less prone to failure than a single high-performance component.

The first and second SOC 102, 104 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the first SOC 102 may include power amplifiers, voltage regulators, oscillators, phase-locked loops, peripheral bridges, data controllers, memory controllers, system controllers, Access ports, timers, and other similar components used to support the processors and software clients running on a mobile computing device. The system components and resources 124 may also include circuitry to interface with peripheral devices, such as cameras, electronic displays, wireless communication devices, external memory chips, etc.

The first and/or second SOCs 102, 104 may further include an input/output module (not illustrated) for communicating with resources external to the SOC, such as a clock 106, a voltage regulator 108, and a wireless transceiver 166 (e.g., cellular wireless transceiver, Bluetooth transceiver, etc.). Resources external to the SOC (e.g., clock 106, voltage regulator 108, wireless transceiver 166) may be shared by two or more of the internal SOC processors/cores.

In addition to the example SIP 100 discussed above, various embodiments may be implemented in a wide variety of computing systems, which may include a single processor, multiple processors, multicore processors, or any combination thereof.

Figure 2:
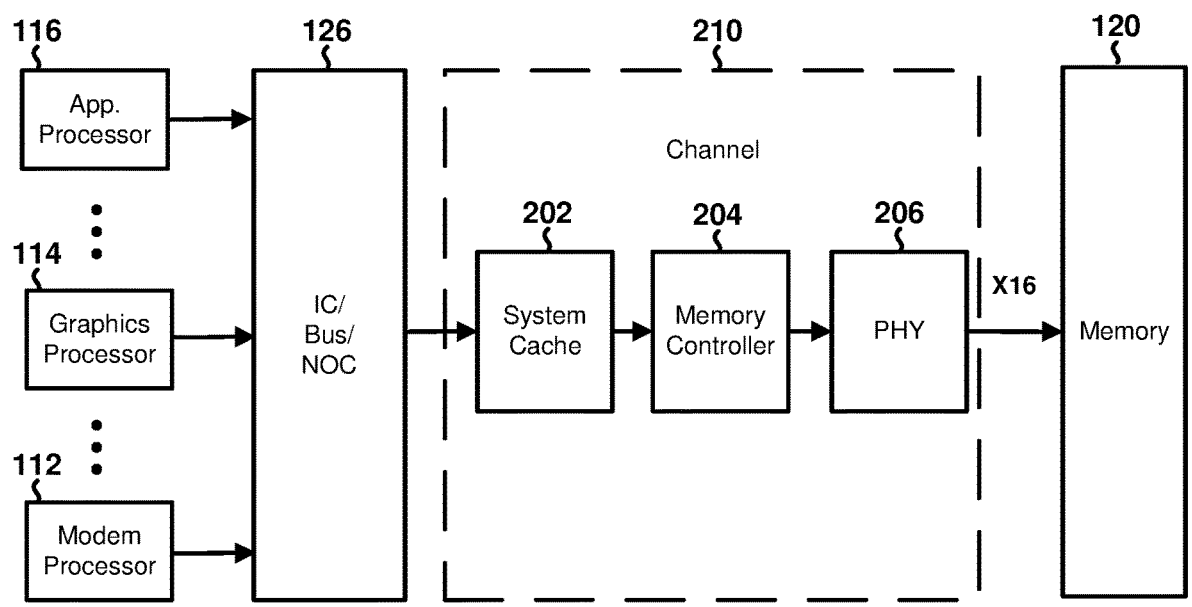

FIG. 2 illustrates a logical configuration of components in a computing system (e.g., SIP 100, SOC 102, etc.) suitable for implementing various embodiments. With reference to FIGS. 1 and 2, processors 112-116 may be configured to use the interconnection bus 126 to send data through channel 210 (which includes a system cache 202, a memory controller 204, and a physical layer interface (PHY) 206, etc.) and ultimately to the memory 120 (which may be Dynamic Random-Access Memory (DRAM)). In some embodiments, any or all of the channel 210, system cache 202, memory controller 204, and PHY 206 may be included as part of the system components and resources 124 component illustrated in FIG. 1.

In the example illustrated in FIG. 2, the SOC includes a multi-channel memory configuration and channel 210 repeats 16 times. As such, it should be understood that the processors (e.g., DSP 110, modem processor 112, graphics processor 114, application processor 116, coprocessors 118, DPU 121, AI processor 122 in SOC 102 and 5G modem processor 152, and additional processors 160 in SOC 104) may communicate via their respective interconnection buses 126, 164, 150, which may connect to multiple channels 210, each of which may include system cache 202, a memory controller 204, and a PHY 206. It should also be understood that each channel may include a communication or memory interface to memory 120, and that the memory controller 204 may be included as part of a SIP 100, SoC 102, 104, or a CPU cluster in various embodiments.

Memory controller 204 may be configured to manage memory operations for hardware accelerators and processors within a CPU cluster, SoC, SIP, etc. In addition, the SoC may include various components (e.g., processors, cores, etc.) that are interconnected through various communication components (e.g., system hub, protocol converter, NOC, etc.). Memory controller 204 may be configured to coordinate the data transmissions and receptions among these components, ensuring efficient and effective communication across the system. In addition, memory controller 204 may facilitate interactions between the processors or CPU clusters and various other subsystems, such as a camera subsystem, video subsystem, display subsystem, application subsystem, or modem subsystem.

Figure 3:
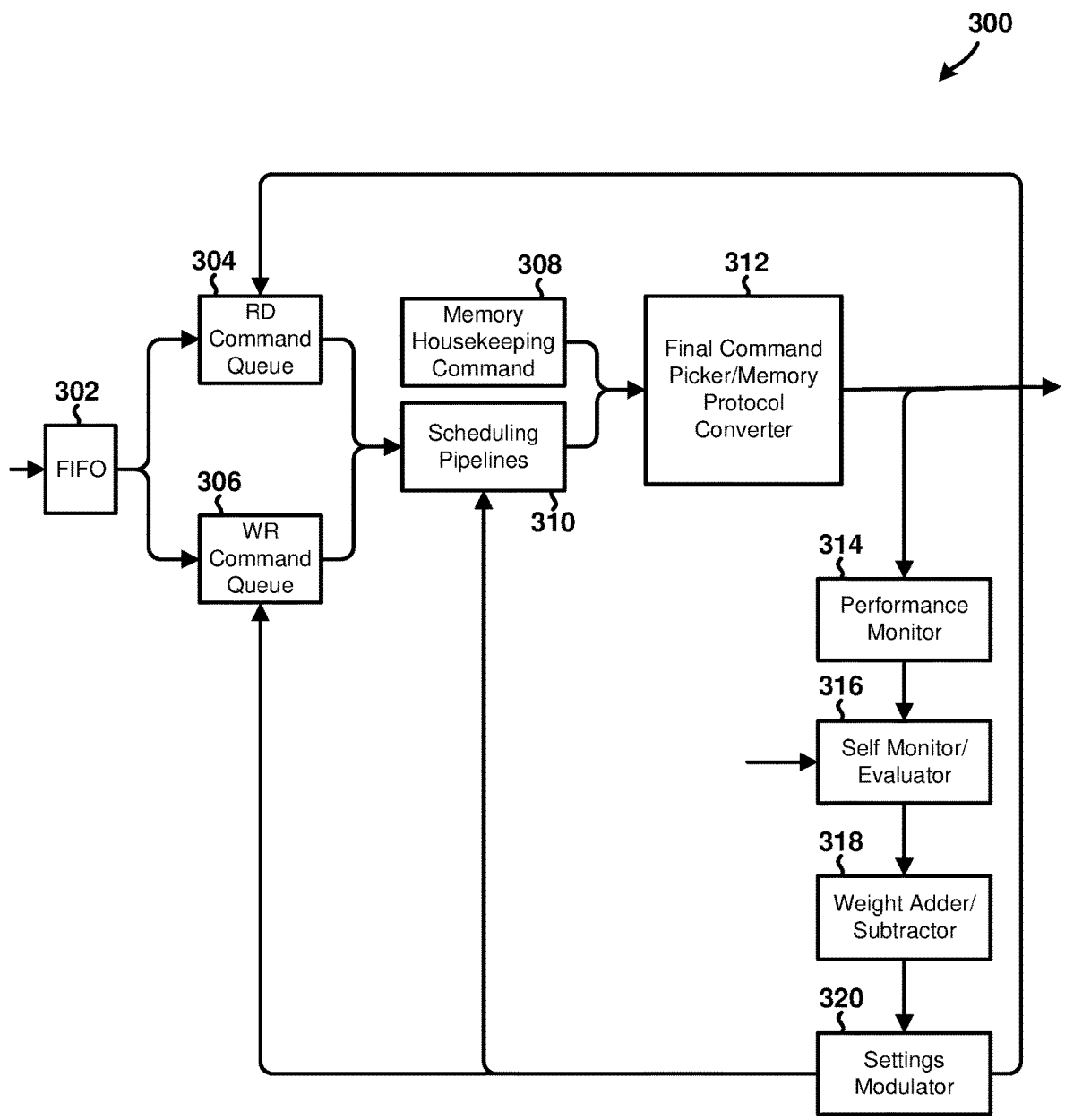

FIG. 3 illustrates example components of an adaptive scheduler engine 300 of an adaptable memory controller system that could be included in a computing system (e.g., SIP 100, SOC 102, etc.) and configured to implement various embodiments. With reference to FIG. 1-3, the adaptive scheduler engine 300 may include a first in first out (FIFO) memory 302, a read (RD) command queue 304, a write (WR) command queue 306, a memory housekeeping command 308 component, scheduling pipelines 310, a final command picker/memory protocol converter 312 component, a performance monitor 314 component, a self-monitor/evaluator 316 component, a weight adder/subtractor 318 component, and a settings modulator 320 component.

The adaptive scheduler engine 300 may be high-performance, low-power memory controllers that could be included and used to enhance memory sub-systems and memory devices for mobile, compute, automotive, AI systems, etc. The adaptive scheduler engine 300 may be configured to perform self-evaluation and self-adaptation operations to increase various key performance indicators (KPI) and/or balance tradeoffs between KPIs. The adaptive scheduler engine 300 may be configured to support various protocols, such as LPDDR2, LPDDR4, LPDDR5, LPDDR5X, LPDDR6, DDR2, DDR3, DDR4, DDR5, etc.

The FIFO memory 302 component may be a storage system for managing data so that data that is first placed into the memory component will be the first to be removed or processed. The FIFO memory 302 component may contribute to the system's efficiency and reliability, particularly in the context of the RD and WR command queues 304, 306. When read or write commands are received, they are placed in their respective queues in order of arrival. The RD command queue 304 component may be a specialized memory queue for read commands that are waiting to be processed by the memory system. Similarly, the WR command queue 306 component may be a specialized queue for write commands. By maintaining a dedicated queue for write commands, the memory controller may manage read and write processes independently.

The memory housekeeping command 308 component may be responsible for the general maintenance of the memory subsystem, such as managing and ensuring data integrity by issuing refresh commands and handling memory clean-up processes. The scheduling pipelines 310 may be configured to facilitate the processing of commands from the different queues, such as the read and write command queues 306, 308, in parallel to improve the overall speed and efficiency of the system. The final command picker/memory protocol converter 312 may select the commands from the scheduling pipelines and ensure compatibility between different memory protocols.

The performance monitor 314 may include multiple timers configured to measure the duration of different events. The performance monitor 314 may be configured to measure the duration of specific events by activating and deactivating the timers. The performance monitor 314 may be configured to repeatedly monitor system parameters (e.g., Idle Time, Data Packet Time, Overhead, etc.) and events using clocks specifically tied to particular events or durations, such as the time interval between read or write commands. The performance monitor 314 may send the parameters and detected events, along with their corresponding durations (e.g., event duration data), to the self-monitor evaluator 316 for analysis.

The self-monitor evaluator 316 may include an AI or rule-based system for analyzing event sequences and their timing, to assesses and learn from past decisions to improve system settings over time, and to use predefined heuristics or rules to adjust the system's settings.

The self-monitor evaluator 316 may be configured to analyze system performance based on information received from the performance monitor 314 and determine operational or parameter adjustments to maintain or improve the performance of the memory controller or computing system. In some embodiments, the self-monitor evaluator 316 may include a timer and an efficiency measurement unit. The self-monitor evaluator 316 may activate and use the timer to monitor the memory controller's efficiency based on the memory controller clock's time duration. The efficiency measurement unit may collect efficiency parameters from the performance monitor 314 (e.g., in response to determining that the timer has started or be activated, etc.), determine the efficiency of the system (e.g., while the timer runs, etc.) based on detected events, durations, and/or information received from the performance monitor 314, and send the determined efficiency information to the weight adder/subtractor 318.

The weight adder/subtractor 318 may be configured to receive and use input from the self-monitor evaluator 316 to adjust system settings that could influence the programming of the read command queue and scheduling pipelines. The weight adder/subtractor 318 may use the determined efficiency information to adjust weights or weight vectors based on whether the latest efficiency count is better or worse than a previous count. In some embodiments, weight adder/subtractor 318 may reference past efficiency counts to determine whether to increase, decrease, or maintain the weight values. The weight adder/subtractor 318 may send the generated information (e.g., weight vectors, adjustment recommendations, etc.) to the settings modulator 320.

The settings modulator 320 may be configured to program the read command queue and scheduling pipelines to implement modifications or adjustments received from the weight adder/subtractor 318. Memory access commands may be received from active processes (e.g., applications) with a priority designation reflective of a timing or acceptable latency associated with particular memory accesses. Conventionally, memory control processes are configure to immediately process high priority (HP) commands, as such commands are associated with stringent latency requirements. To do so, memory commands with low priority (LP) being handed by the memory controller (e.g., in a command queue) may be interrupted or delayed (i.e., not processed in order of receipt). However, processing HP commands immediately upon receipt can reduce efficiency of the memory system in some circumstances. For example, if an executing application is sending LP commands, the data is likely going to be stored in a common location in memory, so breaking the processing of a series of LP commands to process an incoming HP command can impact memory efficiency compared to delaying execution of the HP command until the series of LP commands completes. Thus, increasing the number of LP command execution cycles that may be processed before such commands are preempted to process pending HP commands may increase memory efficiency in such circumstances. On the other hand, if HP commands are held up too long or the process issuing the HP commands is very latency sensitive, the process may issue an urgency request that informs the memory controller that it should promptly address the HP commands (e.g., because latency requirements are not being met).

To balance the processing of HP and LP commands to improve efficiency, the settings modulator 320 may increase the timer or count of LP commands that will be processed before being interrupted to process HP commands so long as urgency requests are not received, or less than a threshold number of urgency requests are received. On the other hand, to meet the latency requirements of processes, particularly as the rate of HP memory operations increases, the settings modulator 320 may decrease the timer or count of LP commands that will be processed before being interrupted to process HP commands. In this manner, the memory system may increase efficiency while remaining responsive to increases in HP commands. The actions of the setting modulator 320 may be continuous to accommodate changes in the nature and volume of memory operations of various processes and applications as execution shifts from processor-intensive actions to memory intensive operations and back, as well as between latency sensitive memory operations and more routine operations. This balancing of HP and LP commands may be implemented as a ratio of low-priority (LP) to high-priority (HP) commands operational parameter that may be adjusted by the settings modulator 320. Thus, the settings modulator 320 may alter the ratio or balance of high-priority (HP) and low-priority (LP) commands to balance improvements in efficiency against maintaining or improving the performance of the system as required to support executing processes.

In some embodiments, the adaptable memory controller may include a power management system (e.g., not illustrated separately in FIG. 3) that is configured to manage power in the device by intelligently scheduling power down commands (e.g., to allow DRAM to shut off input/output pins and conserve power). In some embodiments, the self-monitor evaluator 316 may monitor the timing of commands appearing after power down commands to determine the timing for entering and exiting power-down mode. The self-monitor evaluator 316 may send the determined timing information to the power management system. The power management system may use the timing information to schedule low power entry commands and/or make intelligent decisions about when to enter and exit power-down mode to balance power saving and operational efficiency.

In some embodiments, the adaptable memory controller may be configured to use the hysteresis timer and/or a dithering counter (e.g., not illustrated separately in FIG. 3) to halt adjustments for a period of time. For example, to prevent constant minor adjustments that could cause oscillation or harm overall performance, the adaptable memory controller may detect dithering, determine whether the detected dithering exceeds a threshold value, and halt adjustments for a period of time in response to determining that the detected dithering exceeds the threshold value.

Figure 4:
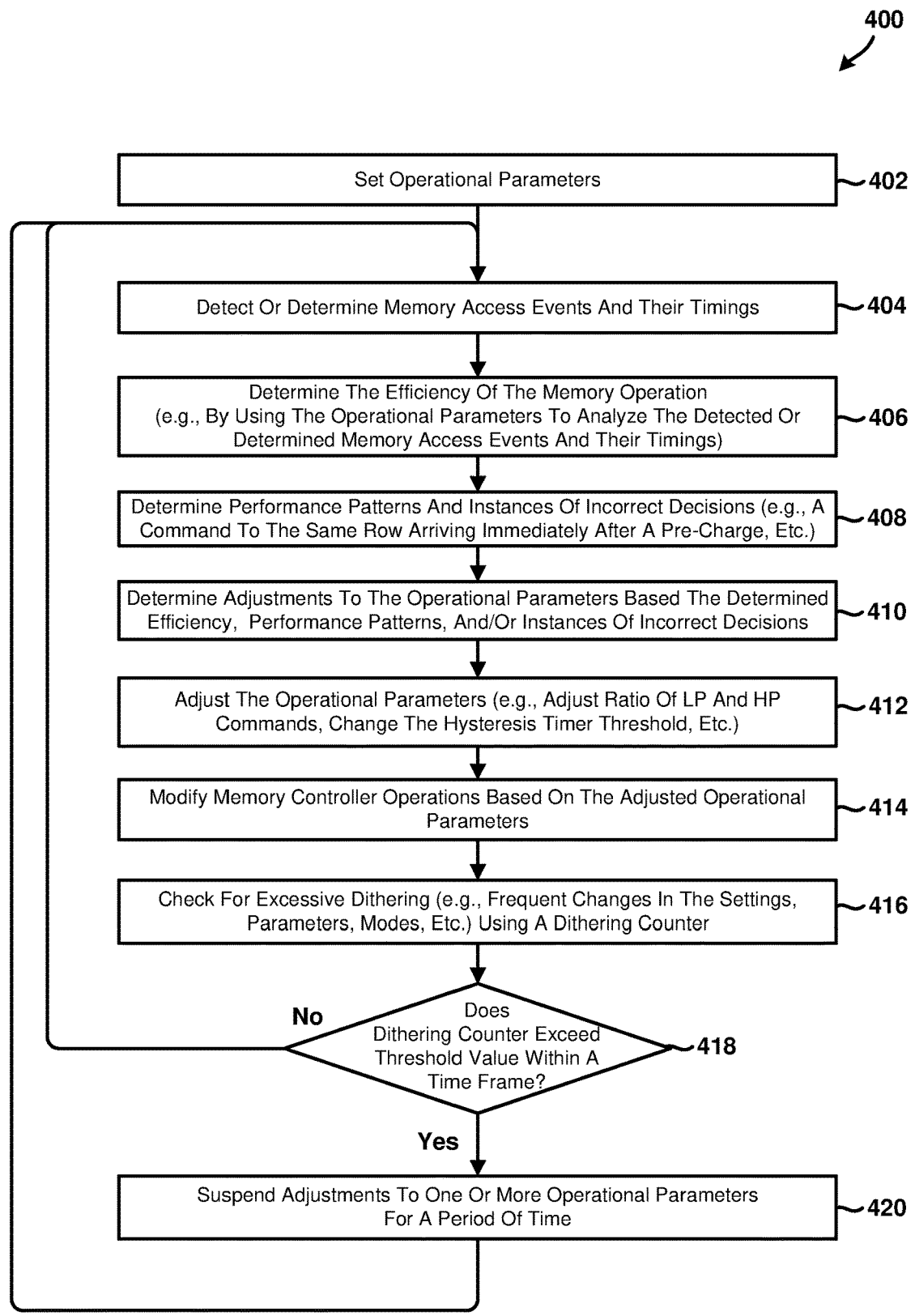
FIGS. 4 and 5 are process flow diagrams illustrating methods of operating memory subsystems in computing device to improve the efficiency of the memory subsystems in accordance with some embodiments.

FIG. 4 illustrates a method 400 of improving the efficiency of a memory sub-system in accordance with some embodiments. Method 400 may be performed in a computing device by any or all of the processing units (e.g., processors 110, 112, 114, 116, 118, 121, 122, 121, 122, 152, 160, etc.), components, or subsystems (e.g., memory controller 204, adaptive scheduler engine 300, etc.) discussed in this application. Means for performing the functions method 400 may include any or all of the processing units (e.g., processors 110, 112, 114, 116, 118, 121, 122, 121, 122, 152, 160, etc.), components, or subsystems (e.g., memory controller 204, adaptive scheduler engine 300, etc.) discussed in this application.

With reference to FIGS. 1-4, in block 402 the computing device may set operational parameters. For example, the computing device may set hysteresis timer thresholds for memory access events. As another example, the computing device may set ratio of low-priority (LP) to high-priority (HP) commands.

In block 404, the computing device may (e.g., via the performance monitor 314, etc.) monitor to detect/determine memory access events and their timings. For example, processor's integrated memory controller (e.g., memory controller 204, etc.) and its accompanying software or firmware may collect data on memory access events that occur within the system, and capture both the nature of these events (whether they are read or write commands) and their timings (when each event starts and ends). The memory access events may include activates, pre-charges, column commands, self-refresh commands, power-down commands, cues from read and write queues, etc.

In block 406, the computing device may (e.g., via the self-monitor/evaluator 316, etc.) analyze the memory access events and their timings to calculate the efficiency of the system. For example, the processor may use the events and their timings to calculate key performance indicators such as Idle Time, Data Packet Time, and Overhead. Idle Time may be calculated by measuring the periods when the memory controller is not processing any data. Data Packet Time may be calculated by adding up the durations during which the memory controller is actively handling data transactions. Overhead may be determined by tracking the time spent on non-data-related operations like memory housekeeping activities. The processor may use the key performance indicators to calculate the system's efficiency. For example, the processor may compare the Data Packet Time (e.g., the productive time) to the sum of the Idle Time and Overhead (e.g., the non-productive time) to generate a ratio value that indicates how efficiently the system is utilizing its resources. The processor may use the ratio value and other performance data make decisions about system adjustments, such as altering scheduling algorithms, changing power modes, and balancing command queues, to optimize the overall performance of the system.

Generally, an ACTIVATE (ACT) command may be used to open a row in a bank in the memory. After the memory row is opened the row may be accessed using a COLUMN (COL) command. If there is another access or accesses that need to be sent to the memory, then no additional ACT command is needed and a COL command may be directly sent to the memory. A PRECHARGE (PRE) command may be used to close the row in a memory bank. After the row is closed in the memory, subsequent access to the bank may need an ACT and then a COL command.

In block 408, the computing device may determine performance patterns and instances of inefficient or incorrect decisions. For example, the processor may track command sequences and recognize patterns that indicate ineffective memory management, such as a command directed to a specific row in memory immediately following a pre-charge command. A pre-charge command is typically sent to close the row of a bank within the memory. The pre-charge command is typically sent after the accesses to the specific row in a bank are completed. As such, a command to the same row immediately following a pre-charge command could indicate that the row was accessed and immediately closed using a pre-charge command, which may be inefficient. This situation could indicate the memory controller's command scheduling algorithm is not effectively handling row buffer locality or that incoming commands are not being sufficiently re-ordered.

In some embodiments, the memory controller may maintain a log of recent commands, along with their associated addresses and timestamps. The memory controller may analyze this log to identify sequences of commands that represent suboptimal behavior. In response to detecting such a pattern, the memory controller may trigger an internal event to notify the processor or the system's firmware, leading to a reevaluation of the memory controller's scheduling parameters or algorithms in order to improve performance and power consumption.

In block 410, the computing device may determine adjustments to the operational parameters based on the determined efficiency, performance patterns, and/or instances of incorrect decisions. For example, the processor may examine the relationship between detected patterns and the current set of operational parameters and determine how changes to these parameters could mitigate the detected issues and improve overall efficiency. In some embodiments, the processor may use a set of built-in heuristics, rules, or machine learning models to determine the appropriate adjustments. These might be based on prior knowledge about the effects of different parameter settings, historical performance data, or predictive modeling.

For example, if the processor finds a high rate of row pre-charging followed by a command to the same row, it may adjust the memory controller's row-buffer management strategy to be more aggressive in keeping rows open, thus reducing pre-charge commands. Alternatively, if the system's efficiency metrics show a high rate of power state transitions due to minor activity, the processor may increase the threshold for activity that triggers a power state transition, thereby reducing the frequency of these transitions. After determining the adjustments, the processor may update the operational parameters of the memory controller. In some embodiments, this may be accomplished through internal interfaces between the processor and the memory controller, which may include both hardware registers and firmware or software interfaces. These updates may then be tested and further refined through continuous monitoring and adjustment.

In block 412, the computing device may adjust the operational parameters (e.g., adjust ratio of LP and HP commands, change the hysteresis timer threshold, etc.). For example, the processor may adjust the operational parameters in the memory controller by interfacing directly with the hardware and/or software that manages the parameters, which may include changing values in specific hardware registers, invoking firmware functions, or sending commands to a microcontroller that manages the memory subsystem.

For example, the processor may modify a scheduling algorithm or policy that determines the priority of memory commands to adjust a ratio of LP and HP commands. If the processor has identified that increasing the ratio of HP commands could improve system efficiency, it could instruct the memory controller to prioritize HP commands more often. As another example, the processor may adjust the hysteresis timer threshold may modifying the timer's configuration settings. The hysteresis timer may be controlled by specific registers that may be written to directly by the processor. The processor may increase the value in the corresponding register in response to determining that a higher threshold could lead to more efficient operation by reducing frequent transitions between power states.

In some embodiments, adjusting the operational parameters in block 412 may also include changing other settings or parameters to maintain proper functioning and balance within the system. For example, changing the ratio of LP and HP commands might affect other aspects of command scheduling, such as the amount of buffer space allocated to each type of command. Similarly, adjusting the hysteresis timer threshold may include changing the settings of other power management components.

In block 414, the computing device may modify memory controller operations based on the adjusted operational parameters. For example, the processor may communicate the new/adjusted parameters to the memory controller, such as by writing the new settings to specific registers within the controller or by issuing special commands to the controller instructing it to change its behavior. For example, if the ratio of low-priority to high-priority commands has been adjusted, the processor could modify the algorithm or policy that the memory controller uses to prioritize and schedule commands. The memory controller would then use this updated policy when deciding how to handle incoming memory requests. If the hysteresis timer threshold has been increased, the memory controller may wait for a longer period of idle time before transitioning into a low-power state. This could reduce the frequency of transitions between different power states, potentially leading to greater energy efficiency.

The processor may also alter the behavior of the memory controller by implementing a new scheduling algorithm that takes into account the adjusted ratio of low-priority to high-priority commands and the increased hysteresis timer threshold. The processor may also make changes to how the memory controller groups commands together, prioritizes different types of commands, handles idle periods, etc. In some embodiments, the processor may continue to monitor the performance of the memory controller after implementing these changes to ensure they are having the desired effect. If the adjustments do not improve performance as expected, the processor may make additional modifications to the operational parameters or adjust different parameters to achieve the desired level of performance and efficiency.

In block 416, the computing device may check for excessive dithering (e.g., frequent changes in the settings, parameters, modes, etc.) using a dithering counter. The dithering counter may allow the processor to keep track of changes in the memory controller's operation to detect excessive dithering and make necessary adjustments to optimize performance and efficiency. For example, the processor may initialize the dithering counter to zero when the memory controller begins its operation or after a reset and increment the dithering counter each time there is a change in settings, parameters, or modes. These changes may include transitions between power modes, adjustments to the ratio of low-priority to high-priority commands, changes to the hysteresis timer threshold, etc.

In determination block 418, the computing device may determine whether the dithering counter exceeds a threshold value within a certain time frame. For example, the processor may repeatedly or continuously monitor the value of the dithering counter, determining whether the counter's value surpasses a predefined threshold within a certain time frame, and determine that the system is experiencing excessive dithering in response to determining that the counter's value surpasses the predefined threshold within the time frame. In some embodiments, the processor may set the threshold value and the time frame based on empirical data, theoretical analysis, or a combination of both.

In response to determining that dithering counter exceeded the threshold value within the time frame (i.e., determination block 418="Yes"), the computing device may suspend adjustments to the operations parameters for a period of time in block 420. That is, the processor may take corrective action to stabilize the system in response to detecting excessive dithering by suspending further adjustments to reduce the frequency or magnitude of changes to settings, parameters, or modes.

In response to determining that dithering counter does not exceed the threshold value within the time frame (i.e., determination block 418="No") or in response to suspending adjustments to one or more operations parameters in block 420, the computing device may repeat the operations in blocks 402-420 to continuously refine the performance of the device. That is, the adjustments are not static but are continuously updated based on ongoing monitoring of system performance. As such, the processor may engage in a dynamic process of adjustment, monitoring the effects of each change and making further modifications as needed to improve the system's efficiency.

In some embodiments, the processor may be configured to reset the dithering counter to zero periodically or under certain conditions (for instance, after a predefined time interval or when the counter's value drops below a certain level). This may allow the system to continue monitoring for excessive dithering over time.

Figure 5:
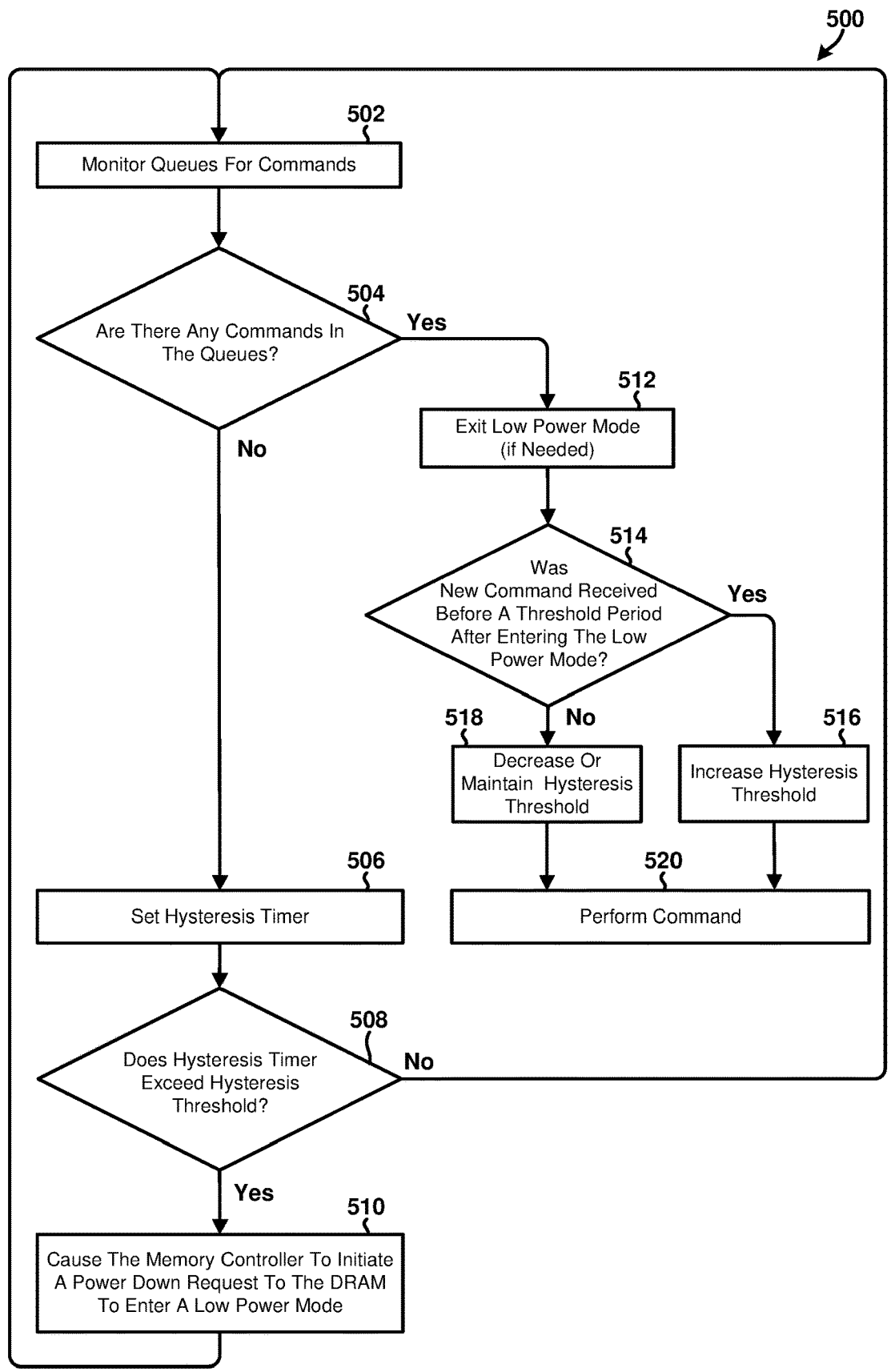

FIG. 5 illustrates a method 500 of improving the efficiency of a memory sub-system in accordance with some embodiments. Method 500 may be performed in a computing device by any or all of the processing units (e.g., processors 110, 112, 114, 116, 118, 121, 122, 121, 122, 152, 160, etc.), components, or subsystems (e.g., memory controller 204, adaptive scheduler engine 300, etc.) discussed in this application. Means for performing the functions method 500 may include any or all of the processing units (e.g., processors 110, 112, 114, 116, 118, 121, 122, 121, 122, 152, 160, etc.), components, or subsystems (e.g., memory controller 204, adaptive scheduler engine 300, etc.) discussed in this application.

With reference to FIGS. 1-5, in blocks 502-520, a processor in a computing device may use its internal architecture, such as its control unit, arithmetic logic unit (ALU), and registers, to monitor, evaluate, make decisions, and send signals based on the current state of the command queue and memory controller in blocks 502-520.

In block 502 the computing device may monitor the command queues (e.g., RD command queue 304, WD command queue 306, etc.) for new or pending commands. For example, in block 502, a processor in the computing device may use the instruction fetch and decode stages in the processor pipeline to repeatedly check for any read or write commands waiting in the queue.

In determination block 504, the computing device may determine whether there are any new or pending commands in the command queues. For example, based on the information fetched in block 502, the processor may use the execution stage in the processor pipeline to determine if any command in the queue needs to be processed.

In response to determining that there are no new or pending commands in the queues (i.e., determination block 504="No"), the computing device may set the hysteresis timer in block 506. For example, the process may set a countdown based on a predetermined hysteresis value if there are no pending commands. This timer may represent the idle period before the processor switches to a lower power mode.

In determination block 508, the computing device may determine whether the hysteresis timer exceeds a hysteresis timer threshold value. For example, the processor may check to determine whether the countdown timer has reached zero, indicating that the predetermined idle time has passed.

In response to determining that the hysteresis timer exceeds the hysteresis timer threshold value (i.e., determination block 508="Yes"), the computing device may cause the memory controller to initiate a power down request to the DRAM to enter a low power mode in block 510. For example, the processor may send a signal to the memory controller to initiate a power-down command to the DRAM, switching it to a lower power mode, in response to determining that timer has reached the timer threshold value (e.g., zero if counting down, etc.).

In response to determining that there are new or pending commands in at least one of the monitored queues (i.e., determination block 504="yes"), the computing device may cause the memory controller to initiate a power up request to the DRAM to exit the low power mode (if needed) in block 512. For example, the processor may send a signal to the memory controller to initiate a power-up command to the DRAM if new commands are detected while the DRAM is operating in low-power mode.

In determination block 514, the computing device may determine whether a new command was received before a threshold period after entering the low power mode. For example, the processor may keep track of the time elapsed since entering the low-power mode and checks to determine whether a new command has arrived during this period.

In response to determining that a new command was received before a threshold period after entering the low power mode (i.e., determination block 514="Yes"), the computing device may increase the hysteresis threshold in block 516. That is, if a new command was received shortly after entering low-power mode, the computing device may increase the hysteresis threshold in block 516. For example, the processor may increase the hysteresis value in response to determining that a new command arrived during the threshold period. Increasing the hysteresis value may extend the idle time required before transitioning to low power mode, improving performance for scenarios in which commands arrive intermittently.

In response to determining that a new command was not received before a threshold period after entering the low power mode (i.e., determination block 514="No"), the computing device may decrease or maintain the hysteresis threshold in block 518. For example, the processor may either maintain the current hysteresis value or decrease it if no new commands arrive within the threshold period. A lower hysteresis value may cause the processor to transition to low power mode quicker during idle periods, saving more energy when commands are less frequent.

In block 520, the computing device may perform the command in the queue (e.g., RD command, WR command, etc.). For example, the processor may retrieve the command from the queue and perform the necessary calculations or data transfers to complete the command.

Figure 6A:
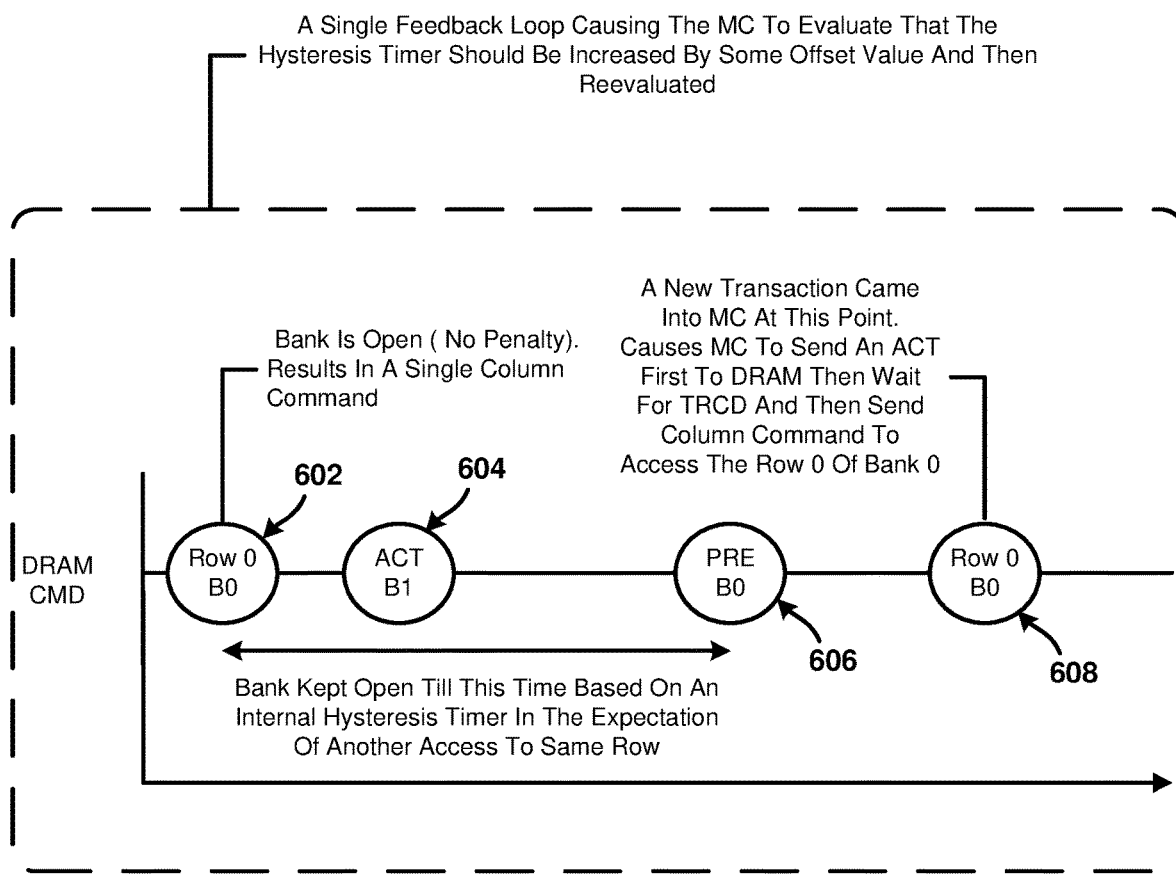
FIGS. 6A-7C are timing diagrams that illustrate example operations in a computing system that includes an adaptable memory controller configured to dynamically or adaptively adjust command scheduling based on real-time metrics in accordance with some embodiments.
Figure 6B:
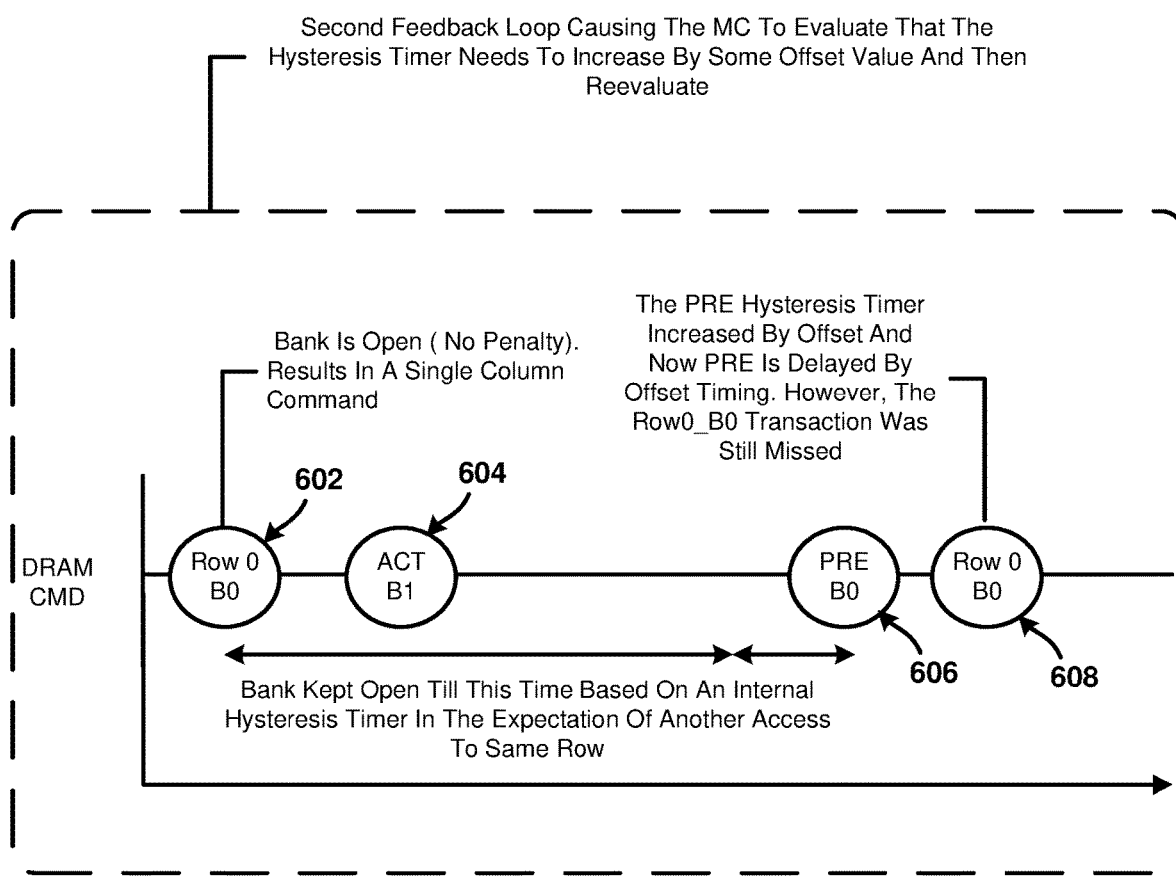
Figure 6C:
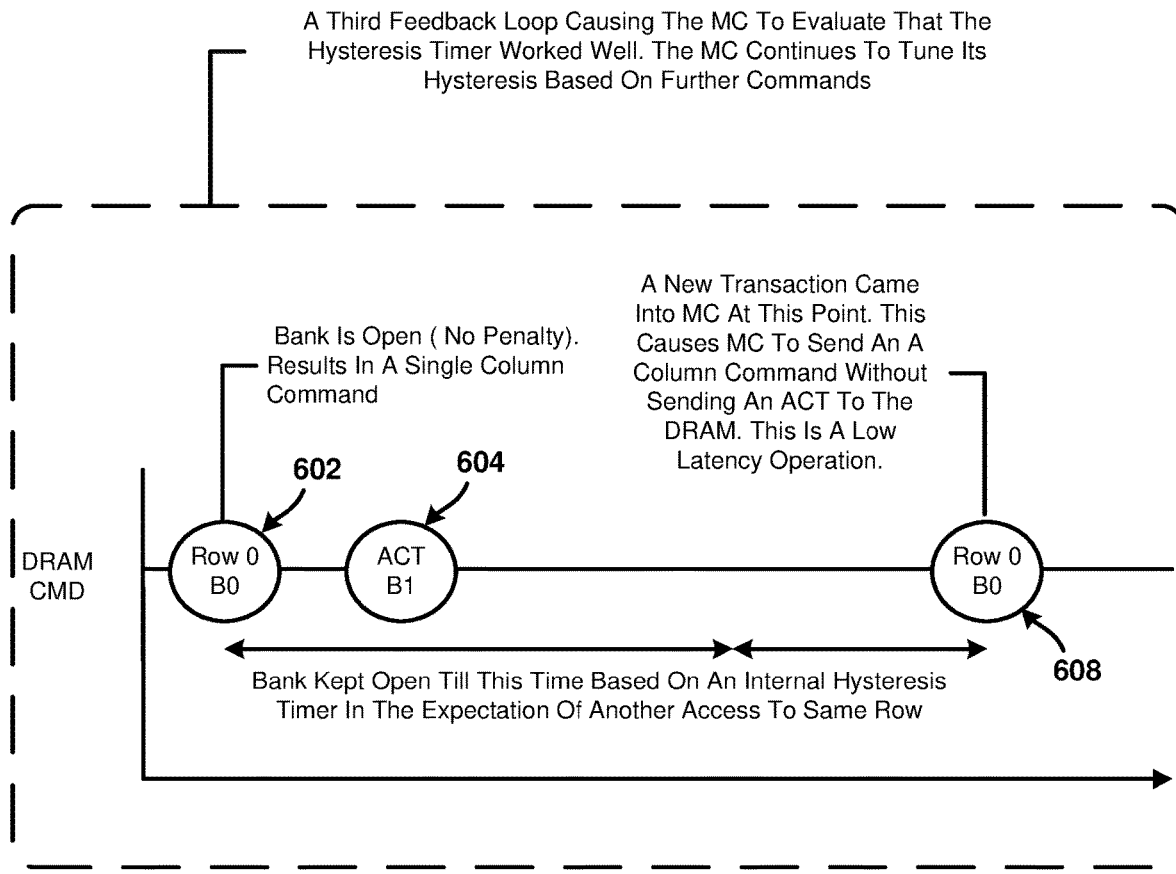

FIGS. 6A-6C are timing diagrams that illustrate example operations in a computing system that includes adaptable memory controller configured to dynamically or adaptively adjust command scheduling based on real-time metrics in accordance with some embodiments. The operations in FIGS. 6A-6C may be performed in a computing device by any or all of the processing units (e.g., processors 110, 112, 114, 116, 118, 121, 122, 121, 122, 152, 160, etc.), components, or subsystems (e.g., memory controller 204, adaptive scheduler engine 300, etc.) discussed in this application. Means for performing the functions of the operations in FIGS. 6A-6C may include any or all of the processing units (e.g., processors 110, 112, 114, 116, 118, 121, 122, 121, 122, 152, 160, etc.), components, or subsystems (e.g., memory controller 204, adaptive scheduler engine 300, etc.) discussed in this application.

FIGS. 6A-6C also illustrate that different commands may interact within the DRAM interface and the computing system may adjust its parameters or operations to improve efficiency while meeting latency and overall performance requirements. The memory controller (MC) may send a row 0 bank 0 column command (COL) 602 to the DRAM. The DRAM may receive the command and send back the data corresponding to the accessed column within the row 0 and bank 0 from the DRAM in the case of a read command or write into the corresponding column of the row within the DRAM bank in the case of a write command. The memory controller may also send an activate (ACT) command 604 to another row in another bank to initiate or activate a timer 604. The memory controller may keep row 0 and bank 0 open (or any of the rows and bank open) until a time based on an internal hysteresis timer in the expectation of another access to the already open row. After the timer expires, the memory controller may send a precharge command 606 to the DRAM to close the bank. In some embodiments, the precharge command 606 may be sent in anticipation of a conflict (e.g., another row command on the same bank). The precharge may prepare the bank for a fresh command, allowing for quicker response times for that future command.

In the example illustrated in FIG. 6A, there is a row 0 bank 0 command 608 to the DRAM after the precharge command 606 has been sent but before the corresponding precharge operation is completed. As a result, the computing system "pays a penalty" in terms of extra processing time because it has to wait for the precharge command 606 to finish, reactivate the row, and then send the new row 0 bank 0 command 608 to the DRAM. Specifically, when a new transaction (e.g., a command or data transfer from the processor to the DRAM, etc.) arrives at the memory controller (MC), the MC's initial step may be to send an Activate (ACT) command to the DRAM. The ACT command opens the targeted row in the memory array, thereby enabling data access or modification. The ACT command may facilitate the MC's access to a row of data within a particular bank of the DRAM. The timing parameter Row-to-Column Delay (TRCD) may be the interval between the ACT command (for opening a row) and a Read/Write command (for accessing a specific cell within the row) during which the memory cells' charge is readied for access. The MC may issue a Read or Write command to a specific column within the activated row or access a specific memory cell in the DRAM after the TRCD delay has elapsed.

In some embodiments, the memory controller may be configured to determine whether a precharge was needed (e.g., when there is a real conflict, etc.) or if it resulted in an unnecessary delay (e.g., when the new command is a hit on the same row and bank, etc.). FIG. 6B illustrates that the memory controller may increase the precharge timing (e.g., by incrementing the hysteresis timer threshold, etc.) in response to determining that the precharge was not necessary. In some embodiments, the memory controller may increase the precharge timing iteratively such that each iteration moves the precharge command a little bit closer to the incoming row 0 bank 0 command 608 (thereby reducing the penalty of a premature precharge).

FIG. 6C illustrates that such self-adjusting systems within the memory controller may continuously adjust the precharge timing (e.g., by incrementing the hysteresis timer threshold, etc.) until the amount of time the bank is left open after a transaction is most efficient. The memory controller may anticipate the need for precharge commands to improve the flow of commands and data in the DRAM system. Such a continuous process of evaluation and adjustment may ensure that the bank is kept open for the most efficient amount of time and/or may ensure the most efficient use of the system's resources.

Figure 7A:
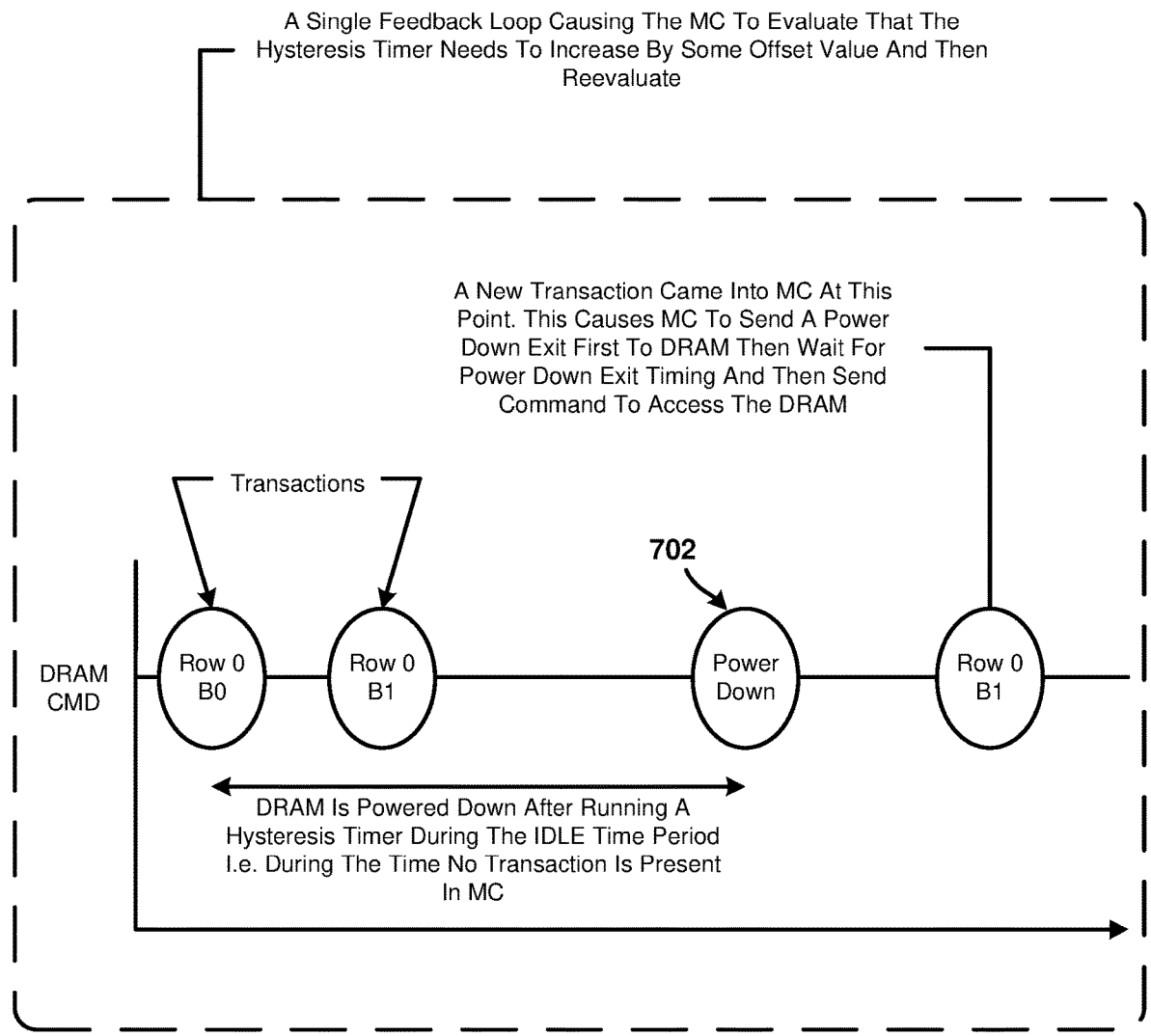
Figure 7B:
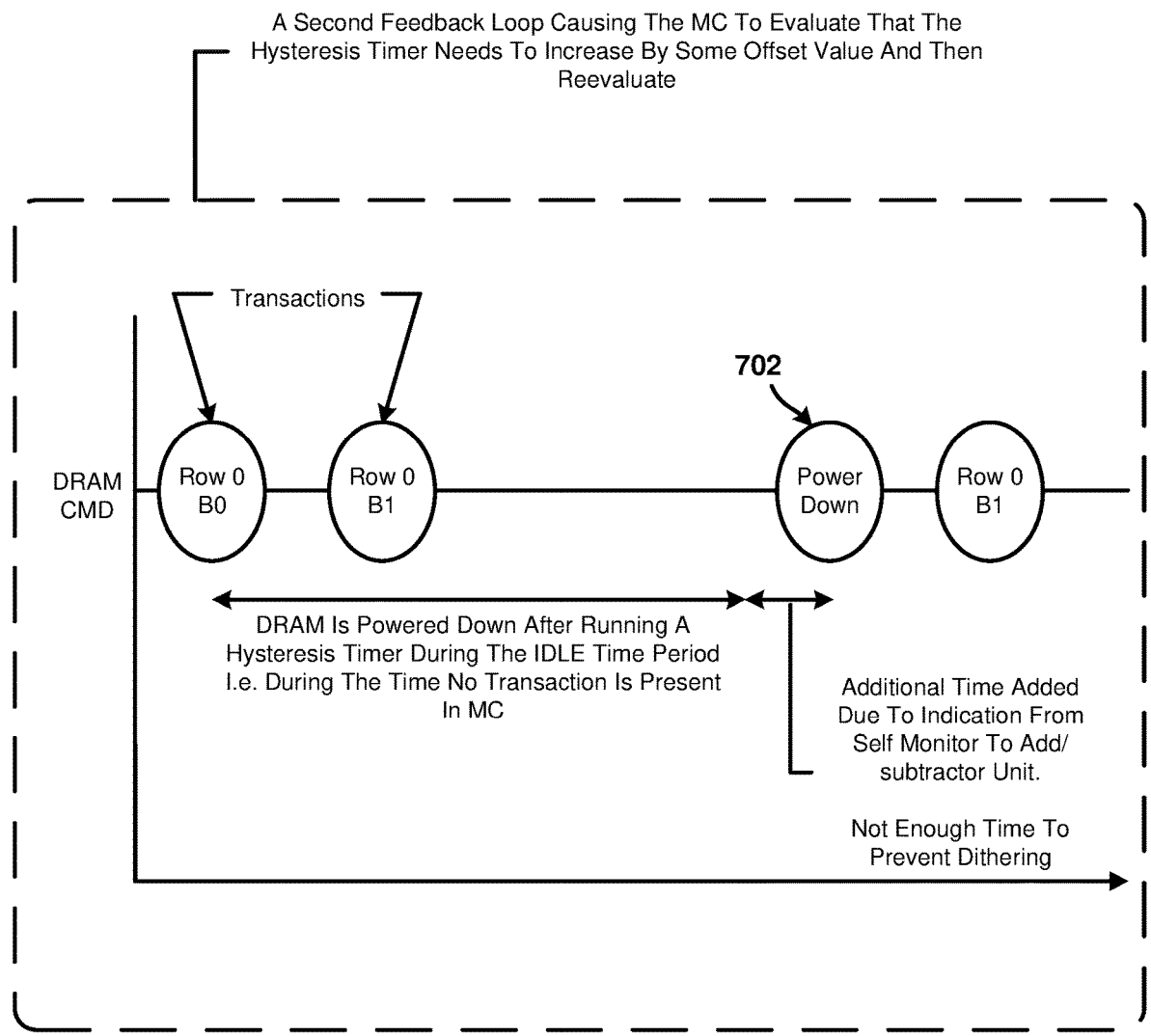
Figure 7C:
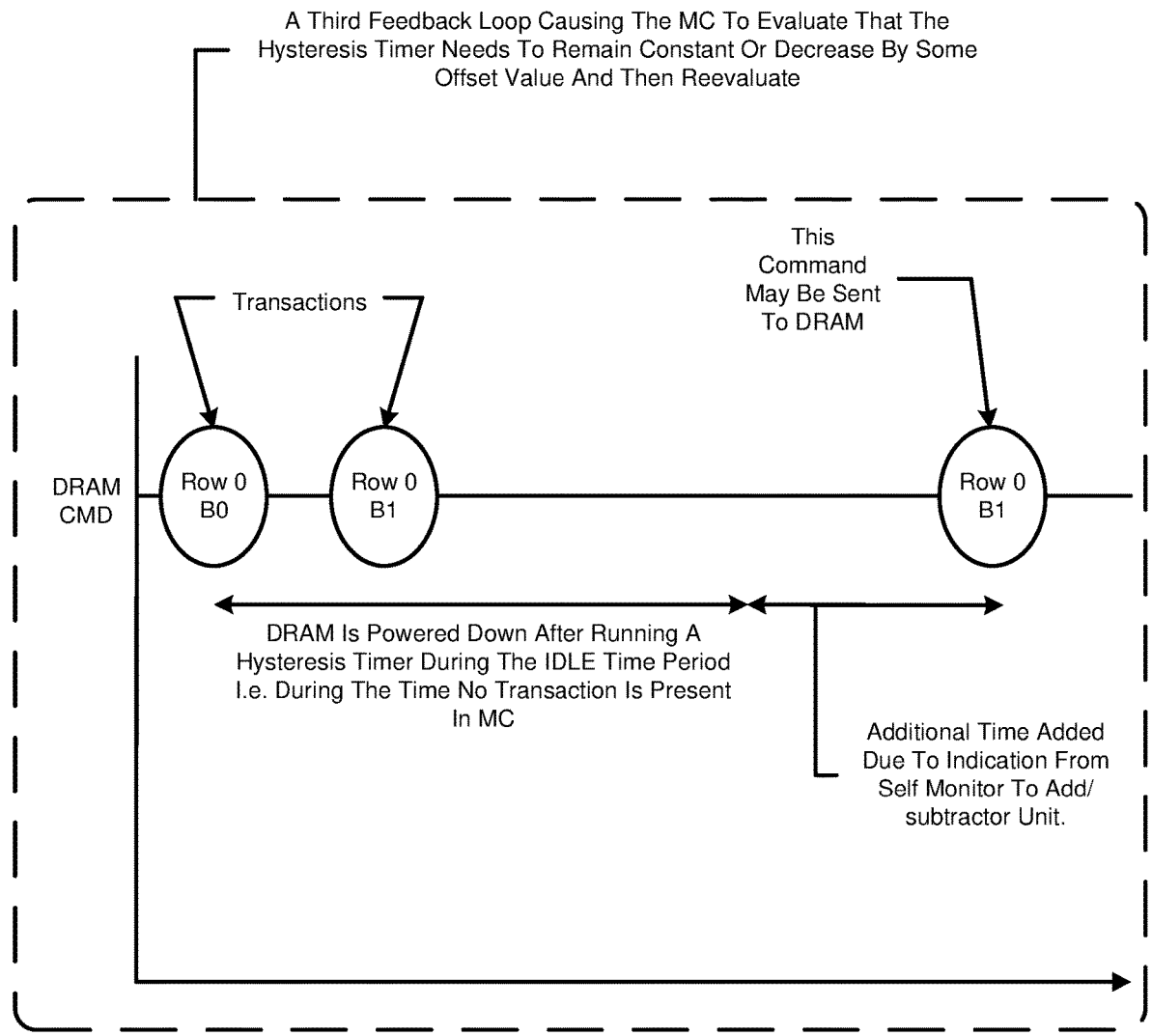

FIGS. 7A-7C are timing diagrams that illustrate additional example operations in a computing system that includes adaptable memory controller configured to dynamically or adaptively adjust command scheduling based on real-time metrics in accordance with some embodiments. The operations in FIGS. 7A-7C may be performed in a computing device by any or all of the processing units (e.g., processors 110, 112, 114, 116, 118, 121, 122, 121, 122, 152, 160, etc.), components, or subsystems (e.g., memory controller 204, adaptive scheduler engine 300, etc.) discussed in this application. Means for performing the functions of the operations in FIGS. 7A-7C may include any or all of the processing units (e.g., processors 110, 112, 114, 116, 118, 121, 122, 121, 122, 152, 160, etc.), components, or subsystems (e.g., memory controller 204, adaptive scheduler engine 300, etc.) discussed in this application.

With reference to FIGS. 1-7C, there may be some tuning challenges with power-down commands (or and self-refresh commands, etc.) and/or that their timers may impact the overall efficiency and latency in the system. The memory controller may be configured to trigger a hysteresis timer in response to determining that its command queues are idle (not receiving any more commands) and send a power-down command to the DRAM when this timer expires.

There may be a number of technical challenges associated with tuning the power-down timer and/or a self-refresh timer to improve performance. For example, a new command may arrive at the memory controller right after a power-down command 702 is issued. As such, the memory controller may have to wait for the power-down entry and exit time, activate the bank, and send the new command. These operations may introduce additional latency in the system and/or otherwise have a negative impact on the performance or functioning of the computing device. As such, the memory controller may continuously adjust the power-down timer based on how soon a new command is received after the power-down operations.

The memory controller may determine that the decision to power down was correct in response to determining that the new command was received long after the power down. The memory controller may determine that the power down command or hysteresis timer was not appropriately tuned in response to determining that the new command was received very shortly after the power down. As such, the memory controller may continue to adjust the timers to move the power-down command closer to the incoming commands, thereby reducing the potential latency and resulting in more efficient memory transactions. More efficient memory transactions may in turn result in less power usage because the system may perform the same amount of work in less time. In addition, the power-down command 702 may be delayed for additional power savings.

Thus, the memory controller may use timers to decide when to power down (enter a low-power state) or self-refresh (refresh data without CPU intervention) the DRAM. These timers may use hysteresis, meaning that the current state depends on its past states, aiming to anticipate periods of inactivity. Tuning these timers may be technically challenging because unanticipated memory commands may arrive shortly after power down, causing latency.

Some embodiments may overcome these technical challenges by configuring the memory control to adjust or "train" the timers based on patterns of memory command arrival post-power down so as to delay power down if there is a high probability that a memory command will arrive shortly after power down. The training may improve both efficiency and latency. Efficiency may refer to the maximum number of commands served in a given amount of time, while latency may refer to the delay experienced in executing these commands. By training the timer, the system may increase efficiency by serving more commands in a given time and reduce latency by minimizing the waiting time for executing commands.

In some embodiments, the memory controller may be tasked with managing commands having different priorities. For example, an incoming HP command may interrupt a sequence of LP commands, potentially reducing efficiency.

In some embodiments, the memory controller may be configured to increase the hysteresis timer for HP commands, delaying their service and potentially improving efficiency by preserving the continuity of LP command execution.

In some embodiments, the memory controller may be configured to decrease or reduce the hysteresis timer to prioritize HP commands that accumulate or signal urgency.

In some embodiments, the memory controller may be configured to perform the training by adjusting the size of the batch and the order in which different types of commands are served (e.g., rank 0 read, rank 1 read, rank 0 write, etc.). The memory controller may optimize or improve the sequence and number of commands that are served in order to further enhance efficiency. The memory controller may adjust or train these and other parameters dynamically, and based on the system's operating state, so as to balance efficiency, latency, and power consumption characteristics on the device.

Figure 8:
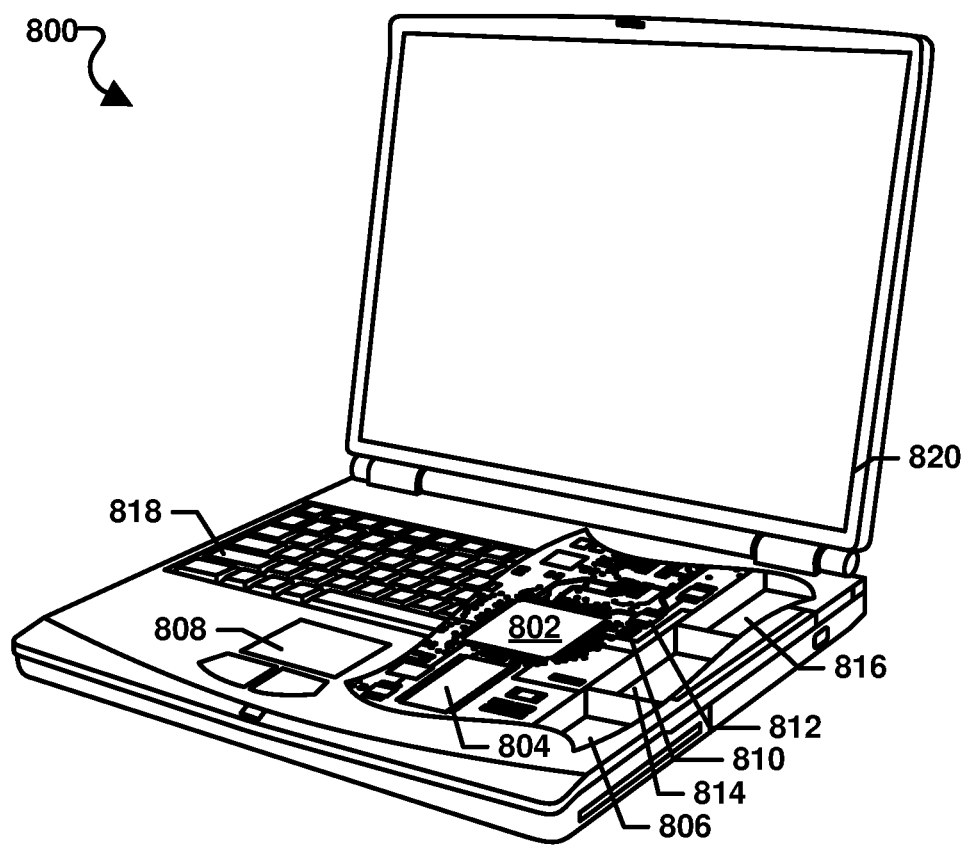
FIG. 8 is a component block diagram illustrating an example computing device suitable for use with various embodiments.

Various embodiments (including, but not limited to, embodiments described above with reference to FIGS. 1-7C) may be implemented in a wide variety of wireless devices and computing systems including a laptop computer 800, an example of which is illustrated in FIG. 8. With reference to FIGS. 1-8, a laptop computer may include a processor 802 coupled to volatile memory 804 and a large capacity nonvolatile memory, such as a disk drive 806 of Flash memory. The laptop computer 800 may include a touchpad touch surface 808 that serves as the computer's pointing device, and thus may receive drag, scroll, and flick gestures. Additionally, the laptop computer 800 may have one or more antenna 810 for sending and receiving electromagnetic radiation that may be connected to a wireless data link and/or cellular telephone transceiver 812 coupled to the processor 802. The computer 800 may also include a BT transceiver 814, a compact disc (CD) drive 816, a keyboard 818, and a display 820 all coupled to the processor 802. Other configurations of the computing device may include a computer mouse or trackball coupled to the processor (e.g., via a Universal Serial Bus (USB) input) as are well known, which may also be used in conjunction with various embodiments.

Figure 9:
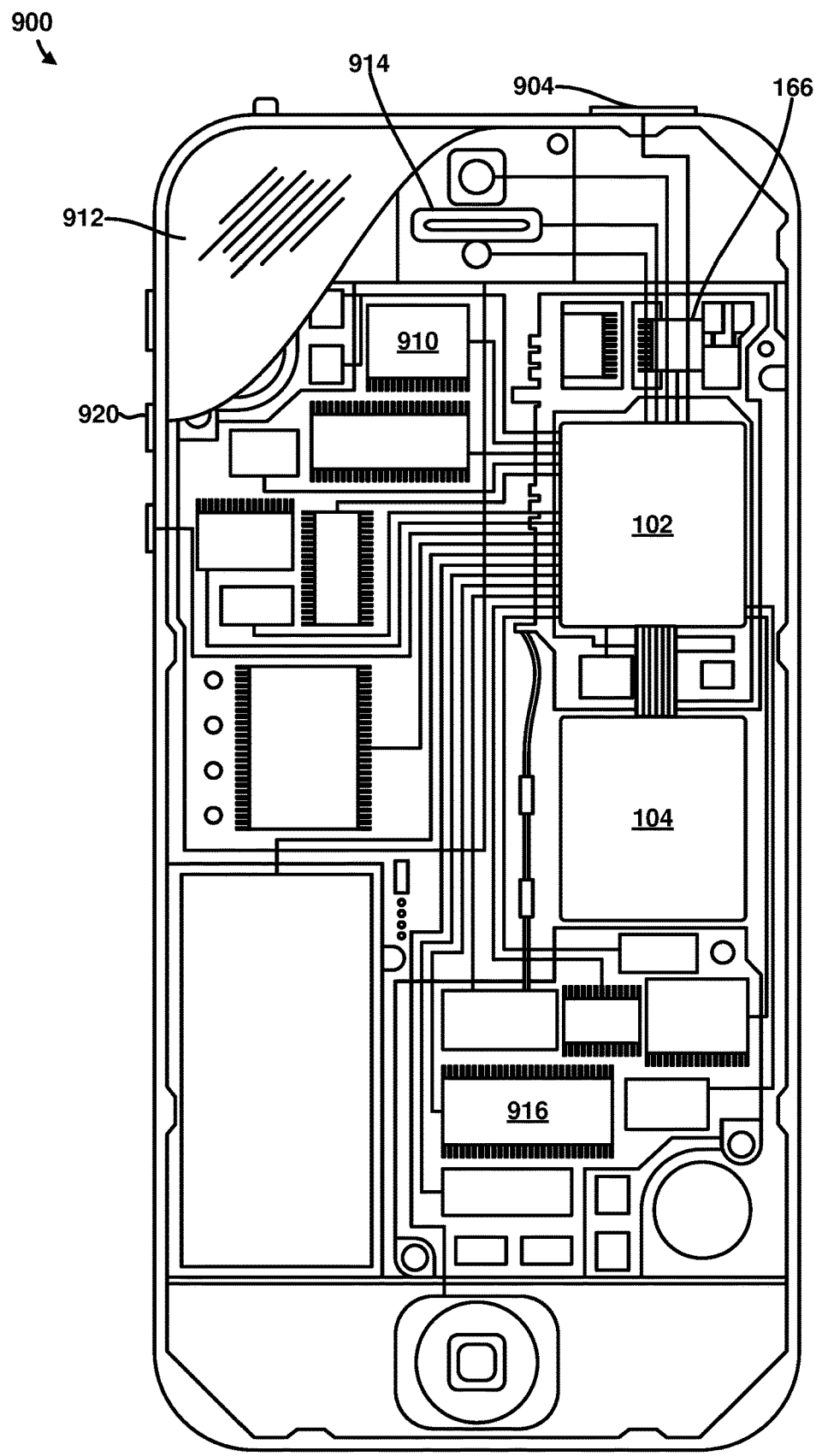
FIG. 9 is a component block diagram illustrating an example wireless communication device suitable for use with various embodiments.

FIG. 9 is a component block diagram of a computing device 900 suitable for use with various embodiments. With reference to FIGS. 1-9, various embodiments may be implemented on a variety of computing devices 900, an example of which is illustrated in FIG. 9 in the form of a smartphone. The computing device 900 may include a first SOC 102 coupled to a second SOC 104. The first and second SoCs 102, 104 may be coupled to internal memory 916, a display 912, and to a speaker 914. The first and second SOCs 102, 104 may also be coupled to at least one subscriber identity module (SIM) 940 and/or a SIM interface that may store information supporting a first 5GNR subscription and a second 5GNR subscription, which support service on a 5G non-standalone (NSA) network.

The computing device 900 may include an antenna 904 for sending and receiving electromagnetic radiation that may be connected to a wireless transceiver 166 coupled to one or more processors in the first and/or second SOCs 102, 104. The computing device 900 may also include menu selection buttons or rocker switches 920 for receiving user inputs.

The computing device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second circuitries 102, 104, wireless transceiver 166 and CODEC 910 may include a digital signal processor (DSP) circuit (not shown separately).

The processors or processing units discussed in this application may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method for improving the efficiency of a memory subsystem in a computing device, including: monitoring memory access events; determining adjustments to operational parameters of the memory subsystem to improve efficiency based on operational parameters of the memory subsystem, memory access events, and associated timings; and adjusting the operational parameters of the memory subsystem based on the determined adjustments.

Example 2. The method of example 1, in which determining adjustments to operational parameters of the memory subsystem to improve efficiency includes: determining timings associated with memory access events based on start and end times of detected memory access events; determining an efficiency of the memory subsystem based on operational parameters of the memory subsystem, memory access events, and associated timings; and determining adjustments to the operational parameters of the memory subsystem based on the determined efficiency, the method further including dynamically modifying operations of the memory subsystem based on the adjusted operational parameters.

Example 3. A method for improving the efficiency of a memory subsystem in a computing device, including: monitoring the memory subsystem to detect memory access events; determining timings associated with detected memory access events based on start and end times of detected memory access events; determining an efficiency of the memory subsystem based on operational parameters of the memory subsystem, the detecting memory access events, and associated timings; determining adjustments to the operational parameters based on the determined efficiency; adjusting the operational parameters of the memory subsystem based on the determined adjustments; and dynamically modifying operations of the memory subsystem based on the adjusted operational parameters.

Example 4. The method of any of examples 1-3, in which monitoring memory access events includes monitoring the memory subsystem to detect at least one of: an activate command; a pre-charge command; a column command; a self-refresh command; a power down command; a signal from a read queue; or a signal from a write queue.

Example 5. The method of any of examples 1-4, in which determining the efficiency of the memory subsystem based on the operational parameters of the memory subsystem, the detecting memory access events, and the associated timings includes least one of: determining an idle time key performance indication (KPI) by measuring periods that the memory subsystem is not actively processing data; determining a data packet time KPI by adding up durations during which the memory subsystem is actively processing data transactions; or determining an overhead KPI by tracking the time spent on non-data related operations.

Example 6. The method of example 5, in which determining the efficiency of the memory subsystem based on the operational parameters of the memory subsystem, the detecting memory access events, and the associated timings further includes: generating an efficiently ratio value by comparing the data packet time KPI to the sum of the idle time KPI and the overhead KPI; and determining the efficiency of the memory subsystem based on the efficiently ratio value.

Example 7. The method of any of examples 1-6, in which determining adjustments to the operational parameters of the memory subsystem to improve efficiency or based on the determined efficiency includes determining the adjustments to the operational parameters based on at least one of a heuristic or a machine learning model.

Example 8. The method of any of examples 1-7, in which adjusting the operational parameters of the memory subsystem based on the determined adjustments includes modifying a scheduling algorithm that determines memory command priorities to adjust a ratio of low-priority (LP) to high-priority (HP) commands operational parameter.

Example 9. The method of any of examples 1-8, in which dynamically modifying the operations of the memory subsystem based on the adjusted operational parameters includes modifying a scheduling algorithm based on an adjusted ratio of low-priority (LP) to high-priority (HP) commands operation parameter and an adjusted hysteresis timer threshold value.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a vehicle's advanced driver assistance system (ADAS), system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for improving efficiency of a memory subsystem in a computing device, comprising:
    monitoring one or more command queues of the memory subsystem;
    signaling the memory subsystem to exit a low power mode based on there being a command in at least one of the one or more command queues;
    determining whether the command was received before a threshold period after the memory subsystem entered the low power mode; and
    adjusting one or more operational parameters of the memory subsystem based on the command being received before the threshold period after the memory subsystem entered the low power mode, wherein:
        the one or more operational parameters comprise a hysteresis value; and
        the adjusting comprises increasing the hysteresis value.

2. The method of claim 1, further comprising: determining timings associated with memory access events based on start and end times of detected memory access events; determining an efficiency of the memory subsystem based on operational parameters of the memory subsystem, memory access events, and associated timings; and determining adjustments to the operational parameters of the memory subsystem based on the determined efficiency, the method further comprising dynamically modifying operations of the memory subsystem based on the adjusted operational parameters.

3. The method of claim 2, wherein monitoring memory access events comprises monitoring the memory subsystem to detect at least one of:
    an activate command;
    a pre-charge command;
    a column command;
    a self-refresh command;
    a power down command;
    a signal from a read queue; or
    a signal from a write queue.

4. The method of claim 2, wherein determining the efficiency of the memory subsystem based on the operational parameters of the memory subsystem, the detecting memory access events, and the associated timings comprises least one of:

determining an idle time key performance indication (KPI) by measuring periods that the memory subsystem is not actively processing data;

determining a data packet time KPI by adding up durations during which the memory subsystem is actively processing data transactions; or determining an overhead KPI by tracking the time spent on non-data related operations.

5. The method of claim 4, wherein determining the efficiency of the memory subsystem based on the operational parameters of the memory subsystem, the detecting memory access events, and the associated timings further comprises:

generating an efficiently ratio value by comparing the data packet time KPI to a sum of the idle time KPI and the overhead KPI; and determining the efficiency of the memory subsystem based on the efficiently ratio value.

6. The method of claim 1, wherein adjusting the one or more operational parameters of the memory subsystem is based on at least one of a heuristic or a machine learning model.

7. The method of claim 1, wherein adjusting the one or more operational parameters of the memory subsystem comprises modifying a scheduling algorithm that determines memory command priorities to adjust a ratio of low-priority (LP) to high-priority (HP) commands operational parameter.

8. The method of claim 2, wherein adjusting the one or more operational parameters of the memory subsystem comprises modifying a scheduling algorithm based on an adjusted ratio of low-priority (LP) to high-priority (HP) commands operation parameter and an adjusted hysteresis timer threshold value.

9. A computing device, comprising:
a memory subsystem; and
a processor coupled to the memory subsystem and configured to:
monitor one or more command queues of the memory subsystem;
signal the memory subsystem to exit a low power mode based on there being a command in at least one of the one or more command queues;
determine whether the command was received before a threshold period after the memory subsystem entered the low power mode; and
adjust one or more operational parameters of the memory subsystem based on the command being received before the threshold period after the memory subsystem entered the low power mode, wherein:
the one or more operational parameters comprise a hysteresis value; and
the adjusting comprises increasing the hysteresis value.

10. The computing device of claim 9, wherein the processor is further configured to:
determine timings associated with memory access events based on start and end times of detected memory access events;
determine an efficiency of the memory subsystem based on operational parameters of the memory subsystem, memory access events, and associated timings; and
determine adjustments to the operational parameters of the memory subsystem based on the determined efficiency,
wherein the processor is further configured to dynamically modify operations of the memory subsystem based on the adjusted operational parameters.

11. The computing device of claim 10, wherein the processor is further configured to monitor the memory subsystem to detect the memory access events by monitoring the memory subsystem to detect at least one of:
an activate command;
a pre-charge command;
a column command;
a self-refresh command;
a power down command;
a signal from a read queue; or
a signal from a write queue.

12. The computing device of claim 10, wherein the processor is further configured to determine the efficiency of the memory subsystem based on the operational parameters of the memory subsystem, the detecting memory access events, and the associated timings by least one of:
determining an idle time key performance indication (KPI) by measuring periods that the memory subsystem is not actively processing data;
determining a data packet time KPI by adding up durations during which the memory subsystem is actively processing data transactions; or
determining an overhead KPI by tracking the time spent on non-data related operations.

13. The computing device of claim 12, wherein the processor is further configured to determine the efficiency of the memory subsystem based on the operational parameters of the memory subsystem, the detecting memory access events, and the associated timings further by:
generating an efficiently ratio value by comparing the data packet time KPI to a sum of the idle time KPI and the overhead KPI; and
determining the efficiency of the memory subsystem based on the efficiently ratio value.

14. The computing device of claim 9, wherein the processor is further configured to adjust the one or more operational parameters based on at least one of a heuristic or a machine learning model.

15. The computing device of claim 9, wherein the processor is further configured to adjust the operational parameters of the memory subsystem by modifying a scheduling algorithm that determines memory command priorities to adjust a ratio of low-priority (LP) to high-priority (HP) commands operational parameter.

16. The computing device of claim 10, wherein the processor is further configured to adjust the one or more operations of the memory subsystem by modifying a scheduling algorithm based on an adjusted ratio of low-priority (LP) to high-priority (HP) commands operation parameter and an adjusted hysteresis timer threshold value.

17. A computing device, comprising:
a memory subsystem;
means for monitoring one or more command queues of the memory subsystem;
means for signaling the memory subsystem to exit a low power mode based on there being a command in at least one of the one or more command queues;
means for determining whether the command was received before a threshold period after the memory subsystem entered the low power mode;
means for adjusting the one or more operational parameters of the memory subsystem based on the command being received before the threshold period after the memory subsystem entered the low power mode, wherein:
the one or more operational parameters comprise a hysteresis value; and
the adjusting comprises increasing the hysteresis value.

18. The computing device of claim 17, further comprising:
means for determining timings associated with memory access events based on start and end times of detected memory access events;
means for determining an efficiency of the memory subsystem based on operational parameters of the memory subsystem, memory access events, and associated timings;
means for determining adjustments to the operational parameters of the memory subsystem based on the determined efficiency; and
means for dynamically modifying operations of the memory subsystem based on the adjusted operational parameters.

19. The computing device of claim 18, wherein means for determining the efficiency of the memory subsystem based on the operational parameters of the memory subsystem, the detecting memory access events, and the associated timings comprises least one of:
means for determining an idle time key performance indication (KPI) by measuring periods that the memory subsystem is not actively processing data;
means for determining a data packet time KPI by adding up durations during which the memory subsystem is actively processing data transactions; or
means for determining an overhead KPI by tracking the time spent on non-data related operations.

20. The computing device of claim 19, wherein means for determining the efficiency of the memory subsystem based on the operational parameters of the memory subsystem, the detecting memory access events, and the associated timings further comprises:
means for generating an efficiently ratio value by comparing the data packet time KPI to a sum of the idle time KPI and the overhead KPI; and
means for determining the efficiency of the memory subsystem based on the efficiently ratio value.

21. The computing device of claim 18, wherein means for determining adjustments to the operational parameters based on the determined efficiency comprises means for determining the adjustments to the operational parameters based on at least one of a heuristic or a machine learning model.

22. The computing device of claim 18, wherein means for adjusting the operational parameters of the memory subsystem based on the determined adjustments comprises means for modifying a scheduling algorithm that determines memory command priorities to adjust a ratio of low-priority (LP) to high-priority (HP) commands operational parameter.

23. The computing device of claim 18, wherein means for dynamically modifying the operations of the memory subsystem based on the adjusted operational parameters comprises means for modifying a scheduling algorithm based on an adjusted ratio of low-priority (LP) to high-priority (HP) commands operation parameter and an adjusted hysteresis timer threshold value.

24. A non-transitory processor-readable medium having stored thereon processor-executable instructions configure to cause a processor of a computing device to perform operations comprising:
monitoring one or more command queues of a memory subsystem;
signaling the memory subsystem to exit a low power mode based on there being a command in at least one of the one or more command queues;
determining whether the command was received before a threshold period after the memory subsystem entered the low power mode;
adjusting one or more operational parameters of the memory subsystem based on the command being received before the threshold period after the memory subsystem entered the low power mode,
wherein:
the one or more operational parameters comprise a hysteresis value; and
the adjusting comprises increasing the hysteresis value.

25. The non-transitory processor-readable medium of claim 24, wherein the stored processor-executable instructions are further configured to cause the processor of the computing device to:
determine timings associated with memory access events based on start and end times of detected memory access events;
determine an efficiency of the memory subsystem based on operational parameters of the memory subsystem, memory access events, and associated timings; and
determine adjustments to the operational parameters of the memory subsystem based on the determined efficiency,
wherein the processor is further configured to dynamically modify operations of the memory subsystem based on the adjusted operational parameters.

26. The non-transitory processor-readable medium of claim 25, wherein the stored processor-executable instructions are further configured to cause the processor of the computing device to perform operations such that determining the efficiency of the memory subsystem based on the operational parameters of the memory subsystem, the detecting memory access events, and the associated timings comprises least one of:
determining an idle time key performance indication (KPI) by measuring periods that the memory subsystem is not actively processing data;
determining a data packet time KPI by adding up durations during which the memory subsystem is actively processing data transactions; or
determining an overhead KPI by tracking the time spent on non-data related operations.

27. The non-transitory processor-readable medium of claim 26, wherein the stored processor-executable instructions are further configured to cause the processor of the computing device to perform operations such that determining the efficiency of the memory subsystem based on the operational parameters of the memory subsystem, the detecting memory access events, and the associated timings further comprises:
generating an efficiently ratio value by comparing the data packet time KPI to a sum of the idle time KPI and the overhead KPI; and
determining the efficiency of the memory subsystem based on the efficiently ratio value.

28. The non-transitory processor-readable medium of claim 24, wherein the stored processor-executable instructions are further configured to cause the processor of the computing device to perform operations such that adjusting the one or more operational parameters is based on at least one of a heuristic or a machine learning model.

29. The non-transitory processor-readable medium of claim 24, wherein the stored processor-executable instructions are further configured to cause the processor of the computing device to perform operations such that adjusting the one or more operational parameters of the memory subsystem comprises modifying a scheduling algorithm that determines memory command priorities to adjust a ratio of low-priority (LP) to high-priority (HP) commands operational parameter.

30. The non-transitory processor-readable medium of claim 25, wherein the stored processor-executable instructions are further configured to cause the processor of the computing device to perform operations such that adjusting the one or more operation parameters of the memory subsystem comprises modifying a scheduling algorithm based on an adjusted ratio of low-priority (LP) to high-priority (HP) commands operation parameter and an adjusted hysteresis timer threshold value.

* * * * *